United States Patent

Okazaki et al.

[11] Patent Number: 5,835,228
[45] Date of Patent: Nov. 10, 1998

[54] IMAGE PICKUP APPARATUS, DENSITY MEASURING OPTICAL SYSTEM AND SCANNING OPTICAL MICROSCOPE

[75] Inventors: Masahide Okazaki; Takahisa Hayashi, both of Kyoto, Japan

[73] Assignee: Dainippon Screen Mfg. Co., Ltd., Kyoto, Japan

[21] Appl. No.: 779,709

[22] Filed: Jan. 7, 1997

[30] Foreign Application Priority Data

Jan. 19, 1996 [JP] Japan .................................. 8-007684
Jan. 19, 1996 [JP] Japan .................................. 8-007685
Jan. 26, 1996 [JP] Japan .................................. 8-012199

[51] Int. Cl.⁶ .......................... G01N 21/55; G01N 21/59
[52] U.S. Cl. ............................................ 356/432; 356/445
[58] Field of Search ..................................... 356/445, 432

[56] References Cited

U.S. PATENT DOCUMENTS 5,159,412 10/1992 Willenborg et al. .................... 356/445
5,563,710 10/1996 Webb et al. ............................ 356/445

OTHER PUBLICATIONS

G. Newkirk, et al., "Reduction of Scattered Light in Coronagraph", *Applied Optics,* vol. 2, No. 2, Feb. 1963, pp. 131–140.

*Primary Examiner*—Vincent P. McGraw
*Attorney, Agent, or Firm*—Ostrolenk, Faber, Gerb & Soffen, LLP

[57] ABSTRACT

An apparatus which can correctly measure and observe optical information obtained from an object by removing a boundary diffraction wave generated from an edge of a pupil of an image pickup lens or an objective lens is provided.

An image pickup lens forms a spatial image of an object on a position provided with a microlens array. A plurality of microlenses are arranged in this microlens array, for pixel-separating the spatial image. Light components from the microlenses pass through corresponding microapertures respectively, to be incident upon corresponding photoreceptors respectively for forming images. The microlenses project images of a diaphragm (pupil) of the image pickup lens on the corresponding microapertures respectively. The diameters of the respective microapertures are set to be smaller than the images of the diaphragm of the image pickup lens, so that a boundary diffraction wave which is generated from an edge of the diaphragm of the image pickup lens is blocked by a microaperture array plate and prevented from propagation to the photoreceptors.

9 Claims, 16 Drawing Sheets

IMAGE PICKUP APPARATUS, DENSITY MEASURING OPTICAL SYSTEM AND SCANNING OPTICAL MICROSCOPE

BACKGROUND OF THE INVENTION

1. Field of the Invention

The present invention relates to an image pickup apparatus for guiding light from an object to an image pickup device which is formed by arranging a plurality of photoelectric conversion elements through an image pickup lens for obtaining an image of the object. The present invention also relates to a density measuring optical system for irradiating an object such as a manuscript or a sample with illumination light from an illumination optical system while guiding light (reflected or transmitted light) from the object to a photoreceiving surface of a photoreceptor thereby measuring the density of a small region of the object. An exemplary typical application of this invention is a scanning optical microscope.

2. Description of the Background Art

In a conventional image pickup apparatus, a plurality of photoelectric conversion elements are one-dimensionally or two-dimensionally arranged to form an image pickup device, for directly guiding light from an object to the image pickup device by an image pickup lens and forming an image of the object on the image pickup device. The respective photoelectric conversion elements of the image pickup device generate electric signals in response to inputs and output the same toward an image processor. Thus, the image of the object is read by pixels of the same number as the photoelectric conversion elements.

The image pickup apparatus is desired to be capable of acquiring images in a dynamic range which is wider than the general one. The term "dynamic range" indicates the range between minimum and maximum densities allowing image acquisition by the image pickup apparatus. An image pickup apparatus having a wide dynamic range can acquire images of manuscripts in excellent reproducibility, while the images cannot be acquired in an excellent state as the dynamic range is narrowed.

While a ghost or scattering by an image pickup lens is generally known as a principal factor narrowing the dynamic range, it has been recognized through various studies made by the inventor that the dynamic range is narrowed by a boundary diffraction wave (the detail thereof and its influence on the dynamic range are described later) in addition to the ghost or scattering. The influence exerted on the dynamic range by the boundary diffraction wave is now described with reference to FIGS. 1A and 1B.

In case of measuring the density of a small black point 2 which is formed on a manuscript 1 shown in FIG. 1A by a conventional image pickup apparatus, for example, image surface illuminance distribution shown in FIG. 1B is obtained on an image pickup device. It is assumed here that there is neither ghost light nor scattered light.

Considering only incident light (illumination light) which propagates in accordance with the rule of geometrical optics, part of the incident light is blocked by the small black point 2, while the remaining part is reflected by the manuscript surface excluding the small black point 2, and advances toward a photoreceptor. Therefore, the illuminance distribution in the image pickup device is zeroed completely in correspondence to the small black point 2 while exhibiting a relatively high value in the position corresponding to the manuscript surface excluding the small black point 2, as shown by solid lines in FIG. 1B. Thus, the image pickup device can detect densities in a range (corresponding to the dynamic range) Rg of minimum to maximum levels.

In practice, however, the image surface illuminance of the image pickup device takes distribution shown by a one-dot chain line in FIG. 1B. This results from such an influence by a boundary diffraction wave that a diffraction image is formed on the image pickup device as a result of composition of an incident wave which is a geometrical optic wave and the boundary diffraction wave.

The term "boundary diffraction wave" indicates a diffraction wave which is generated from an end of a diffracted substance when light is incident upon this substance. In the image pickup apparatus having the aforementioned structure, the diaphragm of the image pickup lens corresponds to the diffracted substance, and the boundary diffraction wave is generated from an edge of this diaphragm. As viewed from the image pickup device, the boundary diffraction wave appears to be generated from an edge of the pupil of the image pickup lens. This boundary diffraction wave is described in detail in "Principles of Optics" by Max Born and Emil Wolf, for example.

When a diffracted image is formed by such an influence by the boundary diffraction wave, the image surface illuminance in the position corresponding to the small black point 2 is not zeroed but increased by $\Delta R$, to narrow the dynamic range Rg+d in this case by $\Delta R$ as compared with the dynamic range Rg in case of ignoring the boundary diffraction wave.

On the other hand, a density measuring optical system is integrated into an image input unit, a photometric microscope, a metallurgical microscope or a film thickness measuring apparatus. For example, an image input unit is integrated with a density measuring optical system comprising an illumination optical system for illuminating a manuscript (object) which is stuck on a manuscript cylinder, a pickup lens (objective lens) and a photomultiplier (photoreceptor). This density measuring optical system irradiates the manuscript with illumination light by the illumination optical system and introduces reflected or transmitted light which is reflected by or transmitted through the manuscript into the photomultiplier by the pickup lens for reading portions (small regions) of an image of the manuscript and outputting electric signals which are responsive to the densities of the small regions. This density measuring optical system is movable in a subscanning direction which is perpendicular to the direction (main scanning direction) of rotation of the manuscript cylinder, and moves in the subscanning direction in synchronization with rotation of the manuscript cylinder. Thus, it is possible to measure the densities of the small regions along the overall manuscript, for reading the image which is formed on the manuscript.

In order to correctly read the image in this image input unit, it is necessary to correctly measure the densities of the small regions by the density measuring optical system. Such a requirement is not restricted to the image input unit but common to general apparatuses such as a photometric microscope, a metallurgical microscope and a film thickness measuring apparatus which are integrated with density measuring optical systems, and every apparatus requires a density measuring optical system which can correctly measure the densities of small regions for making correct observation or measurement.

In the conventional density measuring optical system having the aforementioned structure, however, it is difficult to correctly measure the densities of the small regions. The reason for this is now described with reference to FIGS. 1A and 1B.

In case of measuring the density of the small black point 2 which is formed on the manuscript 1 as shown in FIG. 1A by the conventional density measuring optical system, for example, the image surface illuminance distribution shown in FIG. 1B is obtained on the photoreceiving surface of the photoreceptor. It is assumed here that there is no scattered light.

Considering only incident light (illumination light) which propagates in accordance with the rule of geometrical optics, part of the incident light is blocked by the small black point 2, while the remaining part is reflected by the manuscript surface excluding the small black point 2, and advances toward the photoreceptor. Therefore, the illuminance distribution on the photoreceiving surface of the photoreceptor is zeroed in complete correspondence to the small black point 2 while exhibiting a relatively high value in the position corresponding to the manuscript surface excluding the small black point 2, as shown by the solid lines in FIG. 1B. Thus, the photoreceptor can detect densities in the range (hereinafter referred to as "measuring range") Rg of minimum to maximum levels.

In practice, however, the image surface illuminance on the photoreceiving surface of the photoreceptor takes distribution shown by the one-dot chain line in FIG. 1B. This results from such an influence by the boundary diffraction wave that a diffracted image is formed on the photoreceiving surface as a result of composition of an incident wave which is a geometrical optic wave and the boundary diffraction wave.

In the density measuring optical system having the aforementioned structure, the diaphragm of the objective lens corresponds to the diffracted substance, and the boundary diffraction wave is generated from the diaphragm.

When a diffracted image is formed by such an influence by the boundary diffraction wave, the image surface illuminance in the position corresponding to the small black point 2 is not zeroed but increased by ΔR, to narrows the measuring range Rg+d in this case by ΔR as compared with the measuring range Rg in case of ignoring the boundary diffraction wave. If there is scattered light, the minimum density level is increased by a constant quantity at every position.

This measuring range is related to the dynamic range indicating the degree of density reduction allowing measurement, and if this measuring range is narrowed, it means that the dynamic range is compressed to reduce correctness of density measurement of the small black point 2. Thus, the conventional density measuring optical system has such a problem that correct density measurement of the small black point 2 is rendered difficult due to the presence of the boundary diffraction wave.

On the other hand, a scanning optical microscope is formed to irradiate a sample with illumination light from a light source while receiving light from the sample by a photoreceptor through an objective lens, and adapted to limit illuminated portions irradiated with the illumination light and/or detected portions detected by the photoreceptor to small regions on the sample while scanning the illuminated and/or detected portions which are limited to the small regions, thereby successively detecting images of a plurality of small regions for obtaining an overall image of the sample.

FIG. 2 illustrates an exemplary conventional scanning optical microscope, which is adapted to two-dimensionally move a sample while limiting illuminated and detected portions to small regions thereby scanning the illuminated and detected portions for successively detecting images of a plurality of small regions and outputting signals.

In this scanning optical microscope, illumination light outgoes from a point light source 8 in a direction Z, is condensed on a sample S which is arranged on a prescribed position to be two-dimensionally scannable in directions X and Y in the form of a spot through a beam splitter 7 and an objective lens 3, and applied to small regions on the sample S. Reflected light from the illuminated portions (the small regions irradiated with the illumination light) is incident upon the beam splitter 7 through the objective lens 3 and guided to a photoreceptor 4 by this beam splitter 7, so that the photoreceptor 4 detects images of the same positions as the illuminated portions. When the sample S is two-dimensionally scanned, therefore, light (reflected light) components from the respective small regions of the sample S are successively incident upon the photoreceptor 4 and signals related to images of the small regions are successively outputted from the photoreceptor 4 to an image processing part and subjected to proper image processing, so that the overall image of the sample S is thereafter projected on a display unit.

In this scanning optical microscope, a pinhole plate 6 provided with a pinhole 5 is arranged in the vicinity of a photoreceiving surface of the photoreceptor 4 on a position which is optically conjugate with a focal plane FP. When a small region forming an illuminated portion is present on the focal plane FP, therefore, most part of the light (reflected light) from the small region is incident upon the photoreceptor 4 through the pinhole 5 as shown by solid lines in FIG. 2, and the light quantity (image density) detected by the photoreceptor 4 is increased. If the small region is displaced from the focal plane FP, on the other hand, the incident light quantity in the photoreceptor 4 is remarkably reduced and contribution from a portion other than the focal plane FP disappears, as shown by broken lines in FIG. 2. When the sample S is scanned, therefore, an image of only a specific surface of the three-dimensional sample S, i.e., the so-called tomographic image is obtained. Namely, the scanning optical microscope shown in FIG. 2 is a confocal microscope.

In order to excellently observe an image of a sample having a fine pattern or introducing only extremely feeble light into the photoreceptor or a low-contrast sample in the scanning optical microscope, it is necessary to increase signal-to-noise ratios of signals from the photoreceptor 4. Particularly in the confocal microscope, the resolution in the optical axis direction, i.e., the direction Z, remarkably depends on the signal-to-noise ratios of the signals. Thus, signals having high signal-to-noise ratios are required in order to improve the resolution.

While the signal-to-noise ratios of signals remarkably depend on imaging performance of the optical system and presence of light such as a ghost, a flare or scattered light which is unnecessary for imaging, it has been recognized through various studies made by the inventor that presence of a boundary diffraction wave extremely participates in reduction of the signal-to-noise ratios, in addition to these factors. The influence exerted by the boundary diffraction wave on the signal-to-noise ratio of a signal is now described with reference to FIGS. 1A and 1B.

When the small black point 2 which is formed on the sample 1 (corresponding to the manuscript 1 in the aforementioned image pickup apparatus or density measuring optical system) shown in FIG. 1A is observed with the conventional scanning optical microscope, for example, the image surface illumination distribution shown in FIG. 1B is obtained on the photoreceptor. It is assumed here that there is neither ghost nor scattered light.

Considering only incident light (illumination light) which propagates in accordance with the rule of geometrical optics, part of the incident light is blocked by the small black point 2, while the remaining part is reflected by the manuscript surface excluding the small black point 2, and advances toward the photoreceptor. Therefore, the illuminance distribution in the photoreceptor is zeroed in complete correspondence to the small black point 2 while exhibiting a high value in the position corresponding to the sample surface excluding the small black point 2, as shown by solid lines in FIG. 1B. Thus, the photoreceptor can detect densities in the range (corresponding to the dynamic range) Rg of minimum to maximum levels, and a signal of a high signal-to-noise ratio is obtained.

In practice, however, the image surface illuminance on the photoreceptor exhibits the distribution shown by the one-dot chain line in FIG. 1B. This results from such an influence by the boundary diffraction wave that a diffracted image is formed on the photoreceptor as a result of composition of geometric-optic incident light and the boundary diffraction wave.

In the scanning optical microscope having the aforementioned structure, the diaphragm of the objective lens corresponds to the diffracted substance, and the boundary diffraction wave is generated from an edge this diaphragm.

While the presence of the diaphragm is generally indefinite in the actual objective lens for a microscope, there exists a portion virtually corresponding to the diaphragm, which is assumed to be the diaphragm here.

When a diffracted image is thus formed due to the influence by the boundary diffraction wave, the image surface illuminance in the position corresponding to the small black point 2 is not zeroed but increased by ΔR, to narrow the dynamic range Rg+d in this case by ΔR as compared with the dynamic range Rg in case of ignoring the boundary diffraction wave, and the signal-to-noise ratio of the signal is reduced.

SUMMARY OF THE INVENTION

According to a first aspect of the present invention, an apparatus for obtaining optical information of an object comprises the means of a)a lens for converting first light from the object to second light, b)imaging means for converting the second light, thereby obtaining third light for forming an image of a pupil of the lens on a prescribed position, c)shading means being arranged on the prescribed position for blocking partial light of the third light passing through an outer of a central portion of the image of the pupil, thereby obtaining fourth light by excluding the partial light from the third light, and d)photoreceiving means for receiving the fourth light thereby obtaining the optical information of the object.

According to such a structure, a boundary diffraction wave can be blocked by the shading means, whereby it is possible for the photoreceiving means to correctly receive the optical information of the object.

According to a second aspect of the present invention, in the apparatus of the first aspect, the shading means comprises the means of c-1)a first aperture plate having a first aperture of a smaller size than the image of the pupil.

Therefore, the first aperture plate can block the boundary diffraction wave.

According to a third aspect of the present invention, the apparatus of the second aspect further comprises the means of e)information regulating means for supplying only optical information of a specific region of the object to the first light.

According to a fourth aspect of the present invention, in the apparatus of the third aspect, the information regulating means comprises the means of e-1) restrictive illumination means for illuminating only the specific region of the object.

According to a fifth aspect of the present invention, in the apparatus of the third aspect, the information regulating means comprises the means of e-1) illumination means for illuminating the object, and e-2)a second aperture plate arranged on a position between the object and the lens, the aperture plate having a second aperture of size being responsive to that of the specific region.

According to a sixth aspect of the present invention, in the apparatus of the third aspect, the information regulating means comprises the means of e-1) illumination means for illuminating the object, and e-2)a second aperture plate arranged on a position between the lens and the imaging means, the aperture plate having a second aperture of a size being responsive to that of the specific region.

According to a seventh aspect of the present invention, in the apparatus of the second aspect, the photoreceiving means generates information indicating the optical density of a specific region of the object, whereby the apparatus serves as a density measuring optical system.

This makes it possible to correctly measure the optical density of a specific region of the object without an influence by the boundary diffraction wave.

According to an eighth aspect of the present invention, the apparatus of the second aspect further comprises the means of e)scanning means for successively scanning each part of the object and selecting the same as a specific region, whereby the apparatus serves as a scanning optical microscope.

The sample can be excellently displayed and oserved without an influence by the boundary diffraction wave.

According to a ninth aspect of the present invention, in the apparatus of the second aspect, the imaging means comprises the means of b-1)a lens array, having a parallel arrangement of a plurality of lenses for converting respective parts of the second light to a purality of third light components, for forming images of the pupil of the lens on respective ones of a plurality of positions being set on the prescribed position, the shading means comprises the means of c-1)selective shading means for blocking partial light components of the plurality of third light components passing through outers of central portions of the images of the pupil, thereby obtaining a plurality of fourth light components, and the photoreceiving means comprises the means of d-1)image pickup means for receiving the plurality of fourth light componenets in parallel thereby obtaining information for image acquisition of the object, whereby the apparatus serves as an image pickup apparatus.

It is possible to spread a dynamic range of the image pickup apparatus without an influence by the boundary diffraction wave.

Accordingly, objects of the present invention are to provide an image pickup apparatus having a wide dynamic range by removing a boundary diffraction wave generated from an edge of a pupil of an image pickup lens, to provide a density measuring optical system which can correctly measure the density of a small region of an object by removing a boundary diffraction wave generated from an edge of a pupil of an objective lens, and to provide a scanning optical microscope which can excellently observe a sample by removing a boundary diffraction wave generated from an edge of a pupil of an objective lens and improving the signal-to-noise ratios of signals outputted from a photoreceptor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First, an image pickup apparatus according to the present invention is described.

Figure 3:
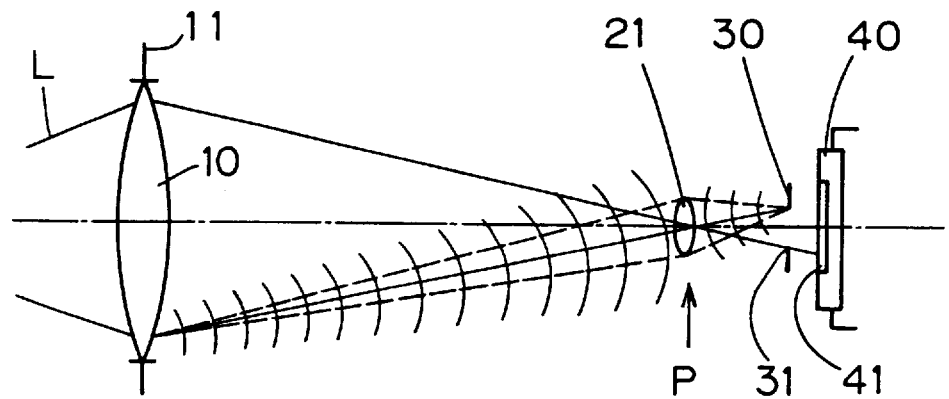
FIG. 3 illustrates an embodiment of an image pickup apparatus according to the present invention.
Figure 4:
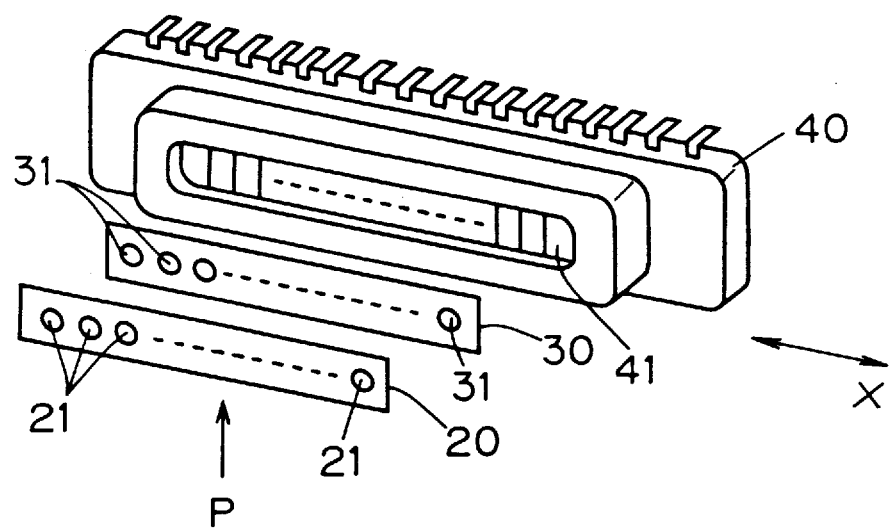
FIG. 4 is a partially enlarged perspective view of the image pickup apparatus shown in FIG. 3.

FIG. 3 illustrates an embodiment of the image pickup apparatus according to the present invention. FIG. 4 is a partially enlarged perspective view of the image pickup apparatus shown in FIG. 3. In this image pickup apparatus, an image pickup lens 10, a microlens array 20 having a plurality of microlenses 21, a microaperture array plate 30 having a plurality of microapertures 31, and an image pickup device 40 which is formed by one-dimensionally arranging a plurality of photoelectric conversion elements 41 in a direction X are arranged in this order. The microlenses 21 and the microapertures 31 are provided in the same number as the photoelectric conversion elements 41, so that the microlenses 21 are one-dimensionally arranged in the direction X in one-to-one correspondence to the microapertures 31, which are also one-dimensionally arranged in the direction X in one-to-one correspondence to the photoelectric conversion elements 41. Thus, the microlenses 21, the microapertures 31 and the photoelectric conversion elements 41 are in one-to-one correspondence to each other according to this embodiment.

The image pickup lens 10 receives light L from an object and condenses the same on a position P on the image pickup device 40 side, for forming a spatial image of the object, as shown in FIG. 3.

The microlens array 20 is arranged on this position P. Therefore, the linear spatial image extending in the direction X is separated by the plurality of microlenses 21 provided on the microlens array 20. In particular, an electric signal outputted from each photoelectric conversion element 41 corresponds to one pixel of an image acquired by the image pickup device 40, and hence the image separated by each microlens 21 corresponds to the pixel and the spatial image of the object is pixel-separated by the microlens array 20.

The light components from the microlens 21 pass through the corresponding microapertures 31 and enter the corresponding photoelectric conversion elements 41 respectively, to form divided images. According to this embodiment, the microlenses 21 project images of a diaphragm (pupil) 11 of the image pickup lens 10 on the corresponding microapertures 31 or in the vicinity thereof respectively, to serve as projectors.

Figure 5:
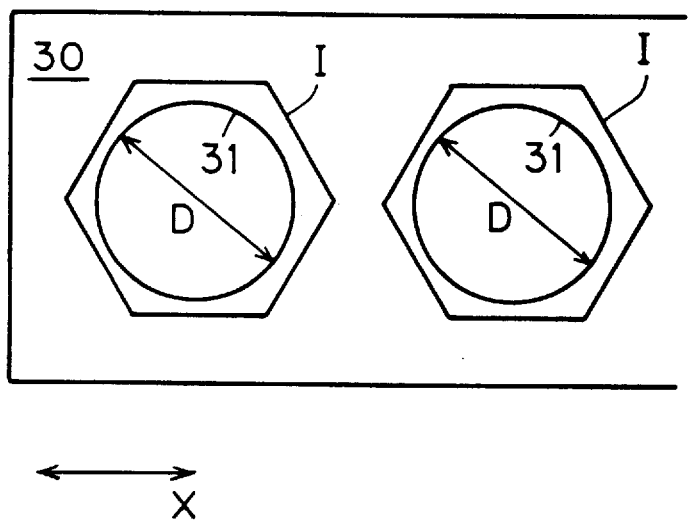
FIG. 5 illustrates the relation between microapertures and images of a diaphragm of an image pickup lens formed on a microaperture array plate 30.

According to this embodiment, diameters D of the microapertures 31 which are formed in the microaperture plate 30 are set to be smaller than images I of the diaphragm 11 of the image pickup lens 10, as shown in FIG. 5. Therefore at boundary diffraction wave BDW which is generated from an edge of the diaphragm 11 of the image pickup lens 10 can be blocked by the microaperture arrays plate 30. This is described in detail with reference to FIG. 3.

As shown by broken lines in FIG. 3, the boundary diffraction wave BDW which is generated from an edge of the diaphragm 11 propagates toward the microaperture array plate 30 side through each microlens 21. Observing each image I of the diaphragm 11 of the image pickup lens 10 formed on the microaperture array plate 30, the edge of the diaphragm 11 appears shiny, due to the boundary diffraction wave BDW generated from this edge, as clearly understood from the above description. According to this embodiment, the diameters D of the microapertures 31 are rendered smaller than the images I of the diaphragm 11 as described above, whereby the boundary diffraction wave BDW is blocked by the microaperture array plate 30 and prevented from propagation toward the image pickup device 40 side. Thus, it is possible to prevent the boundary diffraction wave BDW from passing through the microapertures 31 of the microaperture array plate 30 and entering the image pickup device 40, thereby eliminating an influence by the boundary diffraction wave BDW.

Light components passing through the respective microapertures 31, i.e., light components including no boundary diffraction wave BDW are incident upon the corresponding photoelectric conversion elements 41, which in turn output electric signals corresponding to the images pixel-separated in the microlens array 20 respectively. These electric signals are supplied to an image processor (not shown), to be subjected to prescribed image processing.

In the image pickup apparatus according to this embodiment, as hereinabove described, the influence by the boundary diffraction wave BDW is eliminated by blocking this boundary diffraction wave BDW which is generated from the edge of the diaphragm (pupil) 11 of the image pickup lens 10, whereby the dynamic range of the image pickup apparatus can be widened.

While the above description has been made on an image pickup apparatus for acquiring a linear image (one-dimensional image) by the image pickup device 40 having the one-dimensionally arranged photoelectric conversion elements 41, the present invention is not restricted to a one-dimensional apparatus but also applicable to a two-dimensional image pickup device.

Figure 6:
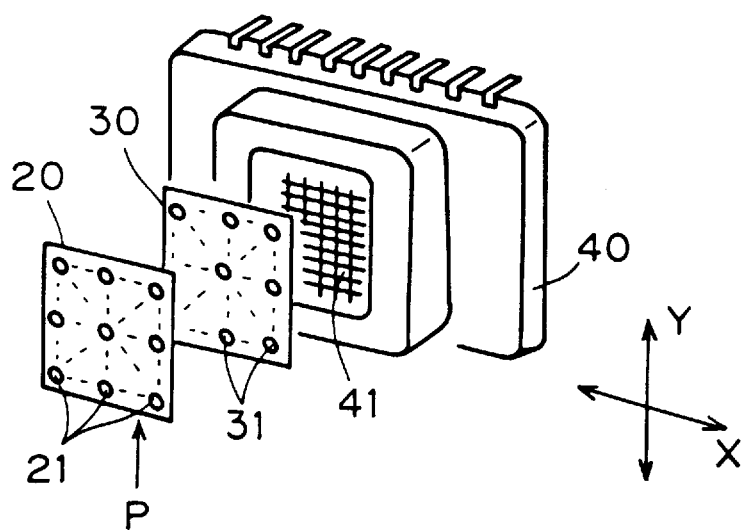
FIG. 6 is a partial perspective view showing another embodiment of the image pickup apparatus according to the present invention.

FIG. 6 is a partial perspective view showing another embodiment of the image pickup apparatus according to the present invention. This image pickup apparatus is different from the aforementioned one:

(1) in a point that photoelectric conversion elements 41 forming an image pickup device 40 are two-dimensionally arranged in an X-Y plane, and (2) in a point that microlenses 21 and microapertures 31 are also two-dimensionally arranged in one-to-one correspondence to the photoelectric conversion elements 41, in response to the two-dimensional arrangement thereof. The remaining basic structure of this embodiment is identical to that of the aforementioned embodiment.

In the image pickup apparatus having the aforementioned structure, it spatial image (two-dimensional image) of an object (not shown) is formed on a position P of a microlens array 20 by an image pickup lens 10 (not shown in FIG. 6), and pixel-separated by the microlenses 21. Light components from the microlenses 21 are incident upon the corresponding photoelectric conversion elements 41 through the corresponding microapertures 31 respectively, so that electric signals corresponding to the images pixel-separated by the microlens array 20 are outputted from the photoelectric conversion elements 41 to an image processor.

A boundary diffraction wave BDW which is generated from an edge of a diaphragm (pupil) 11 of the image pickup lens 10 propagates toward a microaperture array plate 30 through the microlenses 21 similarly to the aforementioned embodiment, while the same is blocked by the microaperture array plate 30 and prevented from propagation toward the image pickup device 40 side. Therefore, it is possible to prevent the boundary diffraction wave BDW from entering the image pickup device 40 through the microapertures 31 of the microaperture array plate 30 so that an influence by the boundary diffraction wave BDW can be eliminated, whereby the dynamic range can be spread also in the two-dimensional image pickup apparatus.

While the microlenses 21 are provided as projection means in the above embodiment, the microapertures 31 serve functions of projection means as pinholes of a pinhole camera when the diameters thereof are set sufficiently small. Therefore, it is possible to form the aforementioned image pickup apparatus without providing the microlenses 21, by sufficiently reducing the diameters of the microapertures 31.

The above embodiment is so formed that the microapertures 31 provided on the microaperture array plate 30 serve as openings for guiding the light components from the microlenses 21 to the photoelectric conversion elements 41 while light (boundary diffraction wave BDW) which is incident upon a portion other than the microapertures 31 is blocked by the microaperture array plate 30. Namely, the microaperture array plate 30 serves as blocking means. However, the blocking means is not restricted to the microaperture array plate 30, but the image pickup device 40 itself may serve as the blocking means. While wiring patterns or the like are formed on the same plane as photoelectric conversion elements in a charge-coupled device (CCD), for example, the surface is covered with a shading member excluding the photoelectric conversion elements so that light is incident upon only the photoelectric conversion elements, and the shading member serves as the blocking means. In this case, it is not necessary to provide the microaperture array plate 30.

The embodiment of the image pickup apparatus shown in FIG. 3 is described. The image pickup apparatus according to this embodiment comprises the following elements:

<The Image Pickup Device 40>

This is a line sensor having the photoelectric conversion elements 41 at pitches of 25 $\mu$m.

<The Image Pickup Lens 10>

The aperture is 20 mm, and the focal length is 60 mm (F number: 3). The diaphragm has a circular shape, and the object is arranged on an infinite point.

<The Microlens Array 20>

This is formed by arranging ion-exchange flat microlenses in the direction X. The aperture of each flat microlens is 20 $\mu$m, and its focal length is 60 $\mu$m (F number: 3).

<The Microaperture Array Plate 30>

This is arranged on a position of 60.1 $\mu$m from the microlens array 20, and provided with the microapertures 31 of 18 $\mu$m in diameter which are arranged at the same pitches (25 $\mu$m) as the photoelectric conversion elements 41 in the direction X. The diameter of each microaperture 31 is set at 18 $\mu$m since the size of an image of the diaphragm of the image pickup lens 10 which is projected on the microaperture array plate 30 is $\phi$20 $\mu$m.

According to the image pickup apparatus having the aforementioned structure, it is possible to block the boundary diffraction wave BDW which is generated from an edge of the diaphragm 11 of the image pickup lens 10 by the microaperture array plate 30 for preventing the boundary diffraction wave BDW from being incident upon the image pickup device 40, thereby spreading the dynamic range of the image pickup apparatus.

In practice, the images of the diaphragm are slightly spread due to aery disks by the microlens array 20, and hence the diameters of the microapertures 31 are preferably slightly reduced, in order to eliminate the influence too. When the F number of the lens is 3 and the wavelength $\lambda$ is 0.55 mm, for example, the radius r of each aery disk is about 2 $\mu$m from r=1.2F$\lambda$, and each image of the diaphragm also has this spreading. In case of blocking spreading of light by the aery disks too, therefore, the diameter of each microaperture 31 is preferably 15 μm or less, with a slight allowance.

A density measuring optical system according to the present invention is now described.

Figure 7:
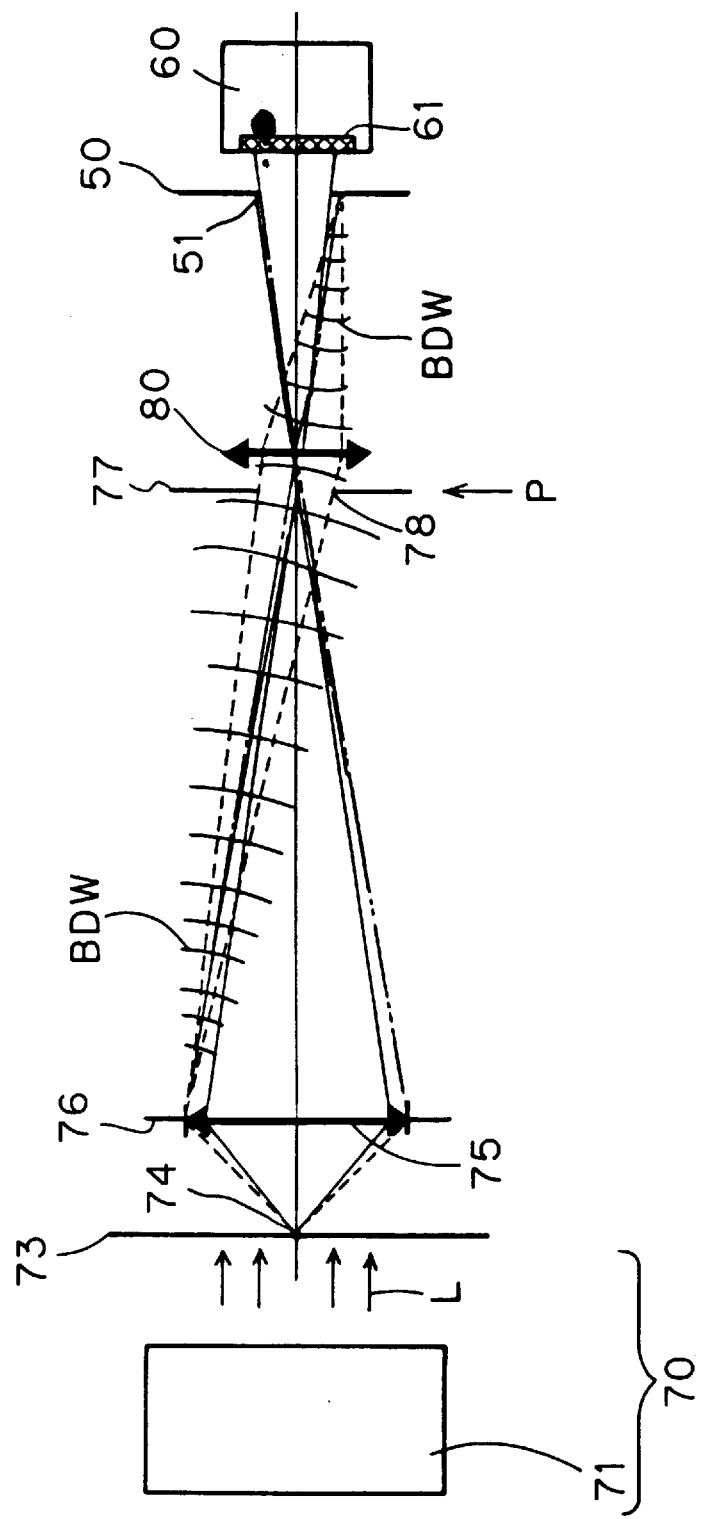
FIG. 7 illustrates an embodiment of a density measuring optical system according to the present invention.

FIG. 7 illustrates an embodiment of the density measuring optical system according to the present invention. This density measuring optical system comprises an illumination optical system 70 for irradiating an object 73 with illumination light L, an objective lens 75, a sampling aperture plate (second aperture plate) 77, a collimator lens 80, an aperture plate (first aperture plate) 50, and a photoreceptor 60 such as a photomultiplier or a solid-state image pickup device.

The illumination optical system 70 comprises an illumination unit 71 for irradiating the overall rear surface of the object 73 with the illumination light L. When the object 73 is illuminated with this illumination optical systemic 70, transmitted light which is transmitted through the object 73 outgoes toward the objective lens 75. While the object 73 is subjected to transmitted illumination in this embodiment, the illumination optical system 70 may alternatively be formed by the so-called reflection type illumination optical system for irradiating the front surface of the object 73 with the illumination light L so that reflected light which is reflected by the object 73 outgoes toward the objective lens 75, as shown in another embodiment described later.

The objective lens 75 is arranged on a position separated from the object 73 by a constant distance, for condensing the light from the object 73 on a position P of the photoreceptor 60 side and forming an image of the object 73.

The sampling aperture plate 77 is arranged on the position P forming the image of the objective lens 75 in the aforementioned manner. This sampling aperture plate 77 is provided with an aperture (second aperture) 78, for cutting out only light from a small region 74 in that from the object 73 toward the photoreceptor 60 through the aperture 78. Thus, the sampling aperture plate 77 serves as sampling means for taking out only the light from the small region 74, the density of which is to be measured.

The collimator lens 80 is arranged on the photoreceptor 60 side of the sampling aperture plate 77, so that the light cut out by the sampling aperture plate 77 through the collimator lens 80 is incident upon the photoreceptor 60 through the aperture plate 50. According to this embodiment, an image I of a diaphragm (pupil) 76 of the objective lens 75 is projected on the aperture plate 50 by the collimator lens 80, which serves as projection means.

Figure 8:
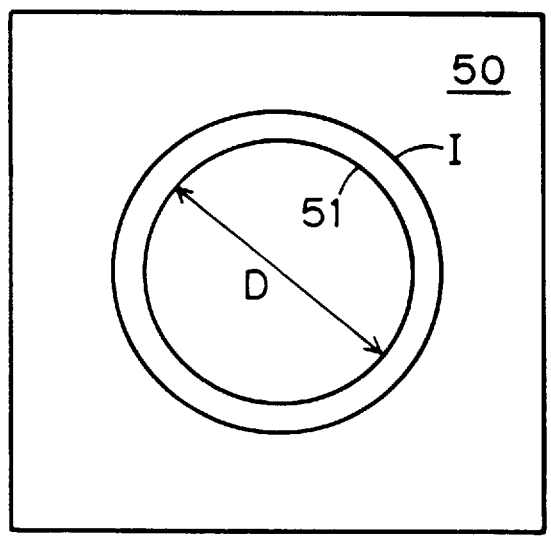
FIG. 8 illustrates the relation between an image of a diaphragm of an objective lens formed on an aperture plate and an aperture diameter.

This aperture plate 50 is provided with an aperture (first aperture) 51, which is arranged oppositely to a photoreceiving surface 61 of the photoreceptor 60. According to this embodiment, further, a diameter D of the aperture 51 is set to be smaller than the size of the image I of the diaphragm 76 of the objective lens 75, as shown in FIG. 8. Therefore, a boundary diffraction wave BDW which is generated from the diaphragm 76 of the objective lens 75 can be blocked by the aperture plate 50. This is described in detail with reference to FIGS. 7 and 8.

As shown by broken lines in FIG. 7, part of the light from the small region 74 is incident upon the diaphragm 76 of the objective lens 75, and the boundary diffraction wave BDW is generated from an edge of the diaphragm 76. This boundary diffraction wave BDW propagates toward the aperture plate 50 through the sampling aperture plate 77 and the collimator lens 80. Observing the image I of the diaphragm 76 of the objective lens 75 which is formed on the aperture plate 50, the edge of the diaphragm 76 appear shiny. As clearly understood from the above description, the edge of the diaphragm 76 appears shiny due to the boundary diffraction wave BDW which is generated from the edge of the diaphragm 76 of the objective lens 75. According to this embodiment, the diameter D of the aperture 51 is rendered smaller than the image I of the diaphragm 76 as described above, whereby the boundary diffraction wave BDW is blocked by the aperture plate 50 and prevented from propagation toward the photoreceptor 60. Thus, it is possible to prevent the boundary diffraction wave BDW from passing through the aperture 51 of the aperture plate 50 and entering the photoreceiving surface 61 of the photoreceptor 60, thereby eliminating an influence by the boundary diffraction wave BDW.

Referring again to FIG. 7, the light passing through the aperture 51 of the aperture plate 50, i.e., that including no boundary diffraction wave BDW, is incident upon the photoreceiving surface of the photoreceptor 60, which in turn outputs an electric signal corresponding to this light. Thus, the density of the small region 74 is measured.

According to the density, measuring optical system of this embodiment, as hereinabove described, the boundary diffraction wave BDW which is generated from the edge of the diaphragm (pupil) 76 of the objective lens 75 is blocked by the aperture plate 50 for eliminating an influence by the boundary diffraction wave BDW, whereby the density of the small region 74 can be correctly measured.

While the collimator lens 80 is provided as projection means in the aforementioned embodiment, the aperture 78 of the sampling aperture plate 77 serves as projection means as a pinhole of a pinhole camera when its diameter is set sufficiently small. Therefore, the aforementioned density measuring optical system can be formed without providing the collimator lens 80 by sufficiently reducing the diameter of the aperture 78.

While the object 73 is widely illuminated with the illumination optical system 70 in the aforementioned embodiment, the range of illumination with the illumination optical system 70 may alternatively be limited to a small range which is substantially identical to the small region 74. In this case, it is possible to suppress the light from the regions other than the small region 74 from reaching the objective lens 75, thereby more correctly measuring the density of the small region 74.

If the aperture of the collimator lens 80 is adjusted to a proper size, the collimator lens 80 can serve not only as projection means but as sampling means. In this case, no sampling aperture plate 77 is necessary.

While the sampling aperture plate 77 serves as sampling means in the aforementioned embodiment, the illumination optical system 70 may be improved in place of the sampling aperture plate 77, so that the illumination optical system 70 can serve not only as illumination means for the object 73 but as sampling means. Such an embodiment is now described with reference to FIG. 9.

Figure 9:
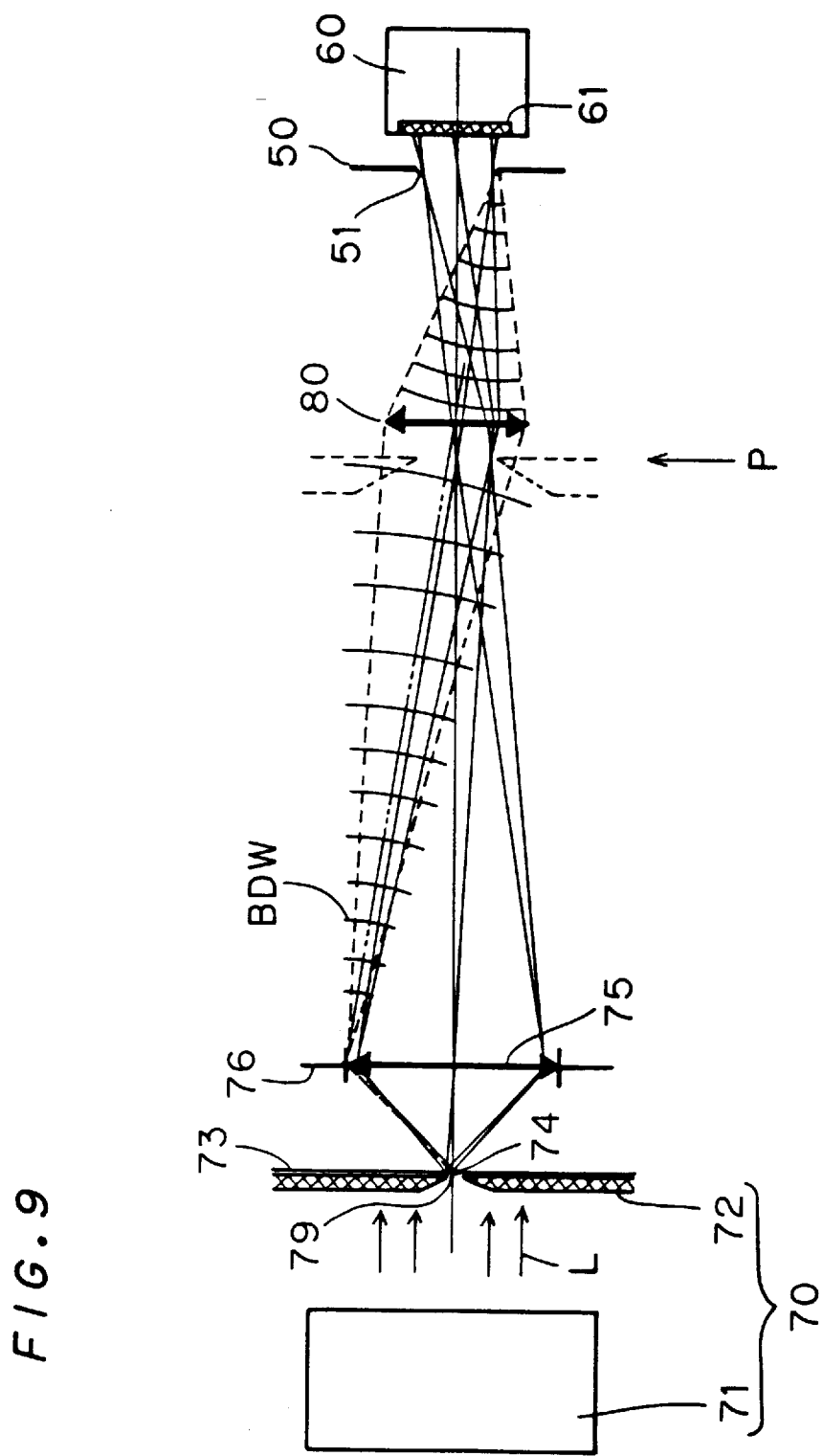
FIG. 9 illustrates another embodiment of the density measuring optical system according to the present invention.

FIG. 9 illustrates another embodiment of the density measuring optical system according to the present invention. In this density measuring optical system, an illumination optical system 70 is formed by an illumination unit 71 and a mask plate 72 for limiting an illumination range. This mask plate 72, which is provided with an opening 79 having an opening size of about the same degree as a small region 74, is so arranged that the opening 79 corresponds to the small region 74 on a rear surface of an object 73. Therefore, only part of illumination light L from the illumination unit 71 passes through the opening 79 to be applied to the small region 74, while the remaining illumination light L is blocked by the mask plate 72. Thus, only the small region 74 is illuminated so that only the light from the small region 74 is guided to a photoreceptor (60 side according to this embodiment. According to this embodiment, therefore, no sampling aperture plate 77 is necessary. The remaining structure of this embodiment is identical to that of the density measuring optical system shown in FIG. 7, and hence components identical to those of FIG. 7 are denoted by the same reference numerals for omitting redundant description.

Also in this embodiment, part of the light from the small region 74 is incident upon a diaphragm (pupil) 76 of an objective lens 75 to generate a boundary diffraction wave BDW from its edge, while a diameter of an aperture 51 provided in an aperture plate 50 is rendered smaller than an image I of the diaphragm 76 of the objective lens 75 which is formed on the aperture plate 50 by the collimator lens 80, whereby the boundary diffraction wave BDW is blocked by the aperture plate 50 and prevented from propagation toward the photoreceptor 60, so that the density of the small region 74 can be correctly measured, similarly to the aforementioned embodiment.

When the aperture 51 of the aperture plate 50 is formed by a variable aperture in each of the density measuring optical systems shown in FIGS. 7 and 9, it is possible to regularly eliminate the influence by the boundary diffraction wave BDW for correctly measuring the density of the small region 74 by changing the numerical aperture of the objective lens 75 while simultaneously adjusting the diameter D of the aperture 51 in response to the changed numerical aperture so that the diameter D of the aperture 51 satisfies the above condition (the diameter D is smaller than the image I of the diaphragm 76 of the objective lens 75 on the aperture plate 50), how the numerical aperture of the objective lens 75 is set.

Various units integrated with density measuring optical systems having, the aforementioned structures are now described.

Figure 10:
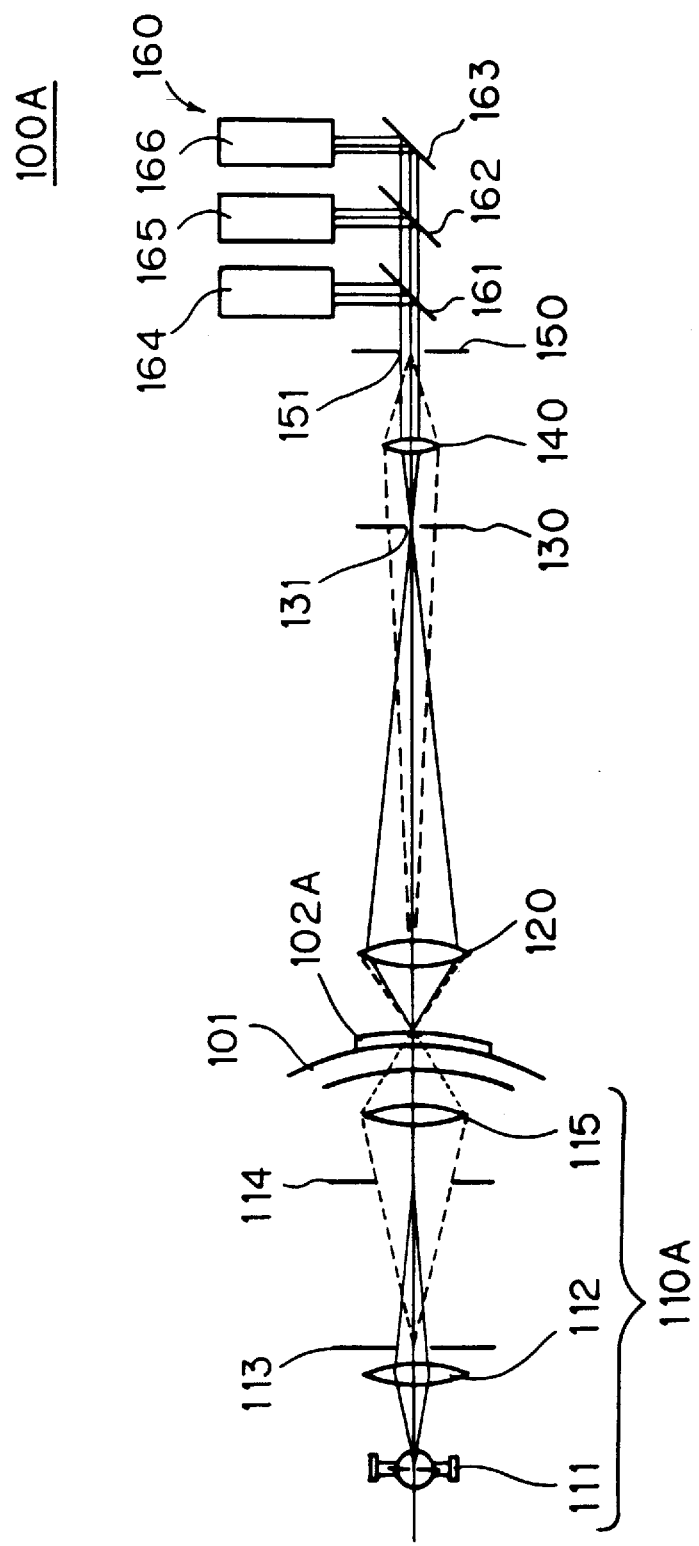
FIG. 10 illustrates an exemplary image input unit integrated with the density measuring optical system according to the present invention.

FIG. 10 illustrates an exemplary image input unit 100A which is integrated with a density measuring optical system according to the present invention. This image input unit 100A is adapted to successively measure densities of respective portions (small regions) of an image formed through a transmitted manuscript 102A which is stuck on a manuscript cylinder 101 by the density measuring optical system for reading the overall image. In this image input unit 100A, the density measuring optical system is formed by an illumination optical system 110A, a pickup lens (objective lens) 120, a sampling aperture plate 130, a collimator lens 140, an aperture plate 150, and a photoreceiving unit 160.

In the illumination optical system 110A, a light source lamp 111, a collector lens 112 for incorporating light from the light source lamp 111, a field stop 113, an aperture stop 114 and a condenser lens 115 are arranged in this order. The light from the light source lamp 111 is condensed on a position provided with the aperture stop 114 through the collector lens 112 and the field stop 113. The transmitted manuscript 102A provided on the manuscript cylinder 101 is irradiated with the light passing through the aperture stop 114 through the condenser lens 115. Thus, the transmitted manuscript 102A is illuminated.

Light from the transmitted manuscript 102A is condensed on the sampling aperture plate 130 by the pickup lens 120, for forming an image of the transmitted manuscript 102. This sampling aperture plate 130 is provided with an aperture (second aperture) 131, so that only light components from small regions of the transmitted manuscript 102A are guided toward the photoreceiving unit 160.

The light components from the small regions which are cut out by the sampling aperture 130 are condensed on the aperture plate 150 by the collimator lens 140, to form an image of a diaphragm (pupil) of the pickup lens 120. The aperture plate 150 is provided with an aperture 151 having a smaller diameter than the image formed in the aforementioned manner. Therefore, part of the light from the transmitted manuscript 102A enters the diaphragm (pupil) of the pickup lens 120 and a boundary diffraction wave is generated from an edge of the diaphragm, while this boundary diffraction wave is blocked by the aperture plate 150 and prevented from propagation toward the photoreceiving unit 160.

On the other hand, light passing through the aperture 151 of the aperture plate 150, i.e., light including no boundary diffraction wave, is incident upon the photoreceiving unit 160, color-separated into three primary colors by two dichroic mirrors 161 and 162 and a total reflection mirror 163, and guided to photomultipliers 164 to 166 which are photoreceptors respectively. Thus, the densities of the small regions with respect to the three primary colors are measured respectively.

According to the image input unit 100A which is integrated with the density measuring optical system formed by the illumination optical system 110A, the pickup lens 120, the sampling aperture plate 130, the collimator lens 140, the aperture plate 150 and the photoreceiving unit 160, as hereinabove described, it is possible to eliminate the influence by the boundary diffraction wave and correctly measure the densities of the small regions forming the image of the transmitted manuscript 102A in three primary colors, whereby the image of the transmitted manuscript 102A can be read in high accuracy.

Figure 11:
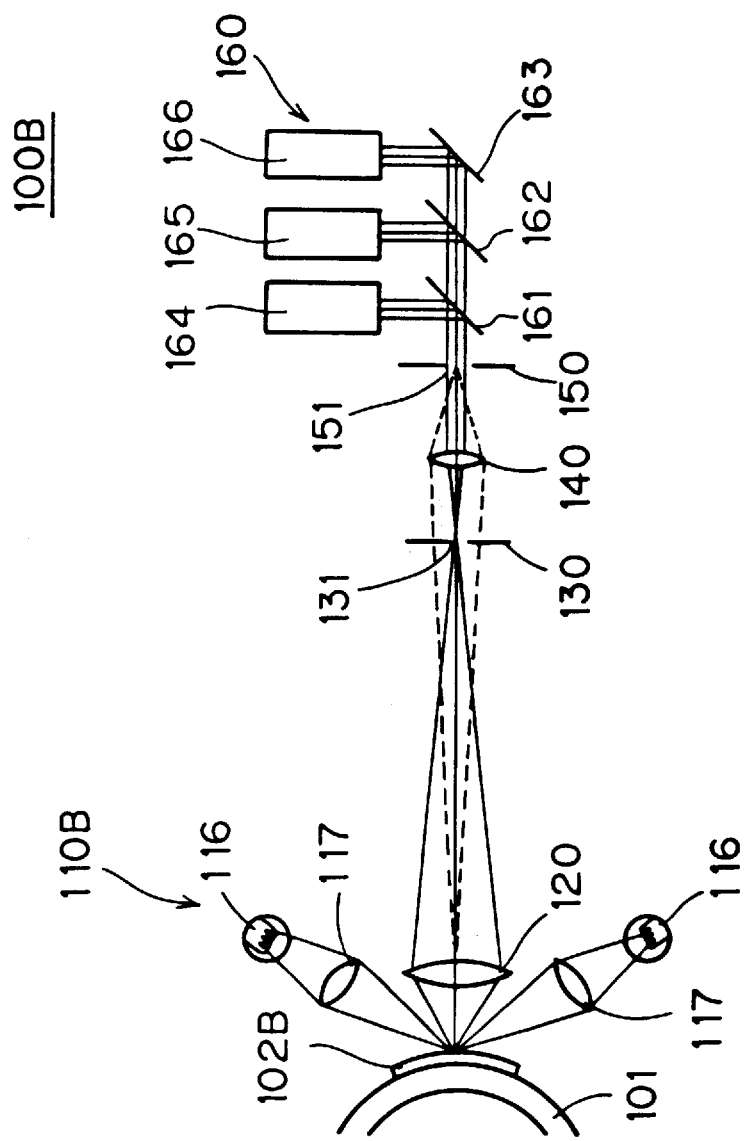
FIG. 11 illustrates another exemplary image input unit integrated with the density measuring optical system according to the present invention.

FIG. 11 illustrates another exemplary image input unit 100B which is integrated with a density measuring optical system according to the present invention. This image input unit 100B is different from the aforementioned image input unit 100A in a point that the image input unit 100B makes reflected illumination for reading a reflected manuscript 102B, while the image input unit 100A makes transmitted illumination for reading the transmitted manuscript 102A, and these units are identical to each other as to structures of receiving light from the manuscripts by the photomultipliers (photoreceptors) for measuring the densities of small regions of the manuscripts. Namely, the density measuring optical system which is integrated into the image input unit 100B is identical to that integrated into the image input unit 100A except that an illumination optical system 100B is formed by a light source lamp 116 and a collector lens 117 so that illumination light from the light source lamp 116 is applied to a surface of the reflected manuscript 102B which is stuck on a manuscript cylinder 101 through the collector lens 117. Therefore, components of the structure other than the illumination optical system 110B are denoted by the same reference numerals, to omit redundant description.

Also in the image input unit for reading the reflected manuscript 102B, it is possible to attain a similar effect, i.e., such an effect that densities of small regions forming an image of the reflected manuscript 102B can he correctly measured in three primary colors while eliminating an influence by a boundary diffraction wave, whereby the image of the reflected manuscript 102B can be read in high accuracy, by integrating the density measuring optical system formed by the illumination optical system 110B, the pickup lens 120, the sampling aperture plate 130, the collimator lens 140, the aperture plate 150 and the photoreceiving unit 160.

Figure 12:
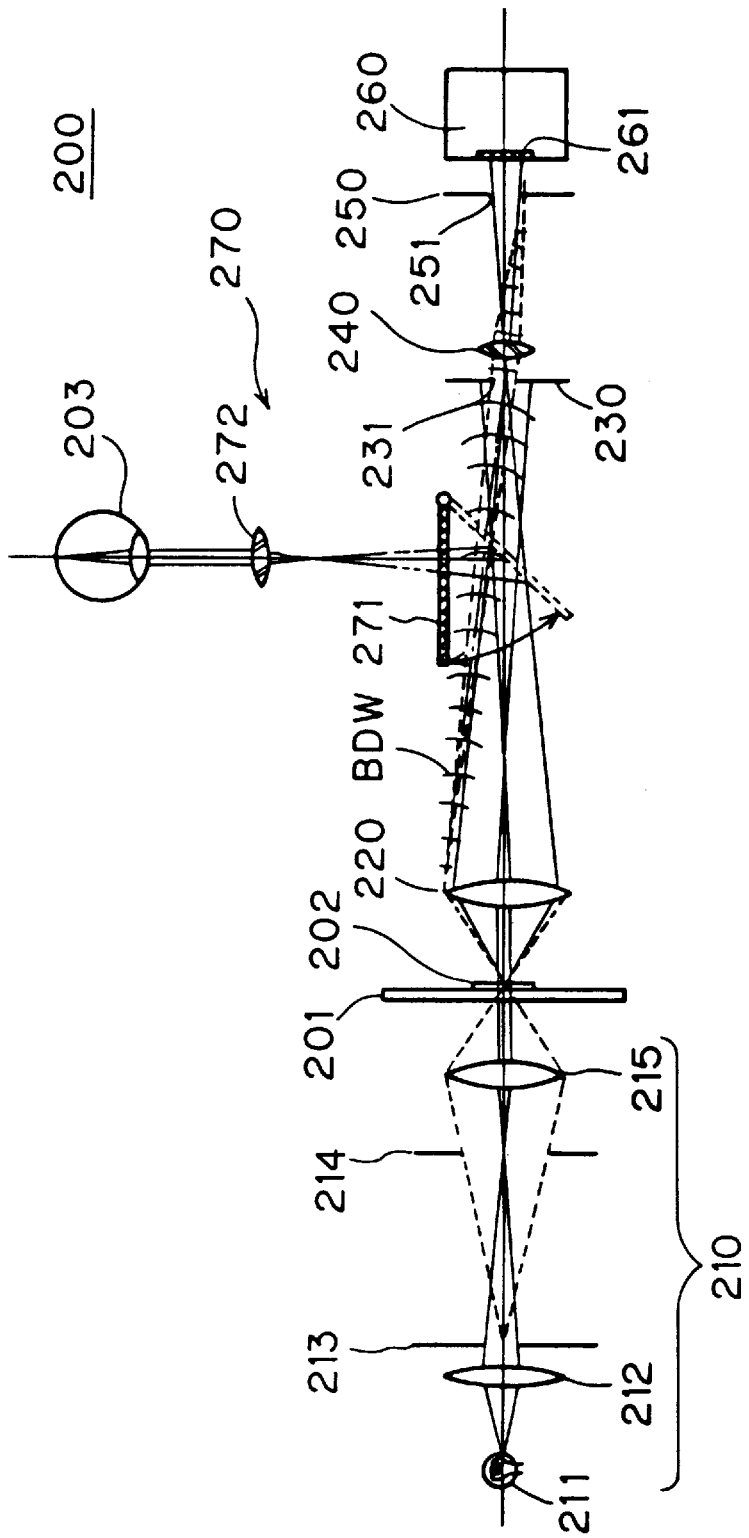
FIG. 12 illustrates an exemplary photometric microscope integrated with the density measuring optical system according to the present invention.

FIG. 12 illustrates an exemplary photometric microscope 200 which is integrated with a density measuring optical system according to the present invention. In this photometric microscope 200, a sample (object) 202 is placed on a stage 201, and an operator moves the stage 201 for properly positioning small regions of the sample 202 while confirming measuring positions through an observation optical system 270, so that the densities of the small regions are thereafter measured by a density measuring optical system having the following structure:

The density measuring optical system is formed by an illumination optical system 210, an objective lens 220, a sampling aperture plate 230, a collimator lens 240, an aperture plate 250 and a photoreceptor 260.

The illumination optical system 210 has a structure which is substantially identical to that of the illumination optical system 110A of the image input unit 100A shown in FIG. 10. Namely, light from a light source lamp 211 is condensed on a position provided with an aperture stop 214 through a collector lens 212 and a field stop 213. Further, the light passing through the aperture stop 214 is applied to the sample 202 provided on the stage 201 by transmitted illumination through a condenser lens 215. Particularly in this density measuring optical system, only small illuminated regions substantially matching with the small regions to be measured are illuminated.

The objective lens 220, the sampling aperture plate 230, the collimator lens 240 and the aperture plate 250 are arranged similarly to corresponding elements to (the pickup lens 120, the sampling aperture plate 130, the collimator lens 140 and the aperture plate 150) of the image input unit 100A shown in FIG. 10. Due to the provision of the sampling aperture plate 230, therefore, only light components from the small regions of the sample 202 pass through an aperture 231 of the sampling aperture plate 230 and are guided toward the photoreceptor 260. The light components from the small regions thus cut out by the sampling aperture plate 230 are condensed on the aperture plate 250 by the collimator lens 240 to form an image of a diaphragm (pupil) of the objective lens 220, while the aperture plate 250 is provided with an aperture 251 having a smaller diameter than the image, so that a boundary diffraction wave BDW which is generated from an edge of the diaphragm (pupil) of the objective lens 220 is blocked by the aperture plate 250. Thus, the boundary diffraction wave BDW is prevented from propagation toward the photoreceptor 260.

On the other hand, light passing through the aperture 251 of the aperture plate 250, i.e., light including no boundary diffraction wave BDW, is incident upon a photoreceiving surface 261 of the photoreceptor 260, which in turn outputs electric signals corresponding to the densities of the small regions.

Referring to FIG. 12, numerals 271 and 272 denote a movable mirror and an ocular forming the observation optical system 270 respectively, and numeral 203 denotes an eye of the operator.

According to the photometric microscope 200 integrated with the density measuring optical system formed by the illumination optical system 210, the objective lens 220, the sampling aperture plate 230, the collimator lens 240, the aperture plate 250 and the photoreceptor 260, as hereinabove described, it is possible to measure the densities of the small regions of the sample 202 without being influenced by the boundary diffraction wave BDW, thereby improving photometric accuracy.

Figure 13:
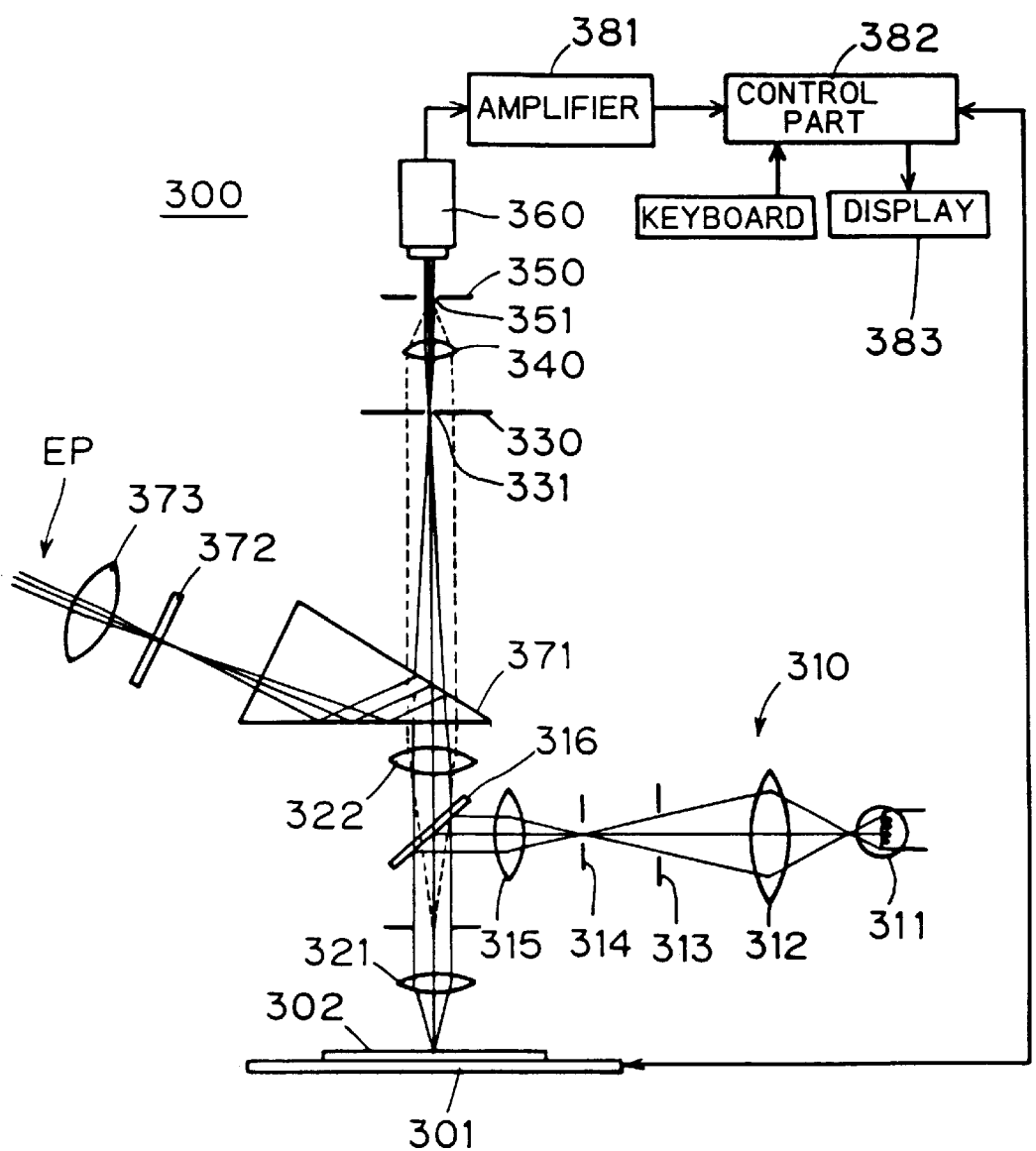
FIG. 13 illustrates an exemplary metallurgical microscope integrated with the density measuring optical system according to the present invention.

FIG. 13 illustrates an exemplary metallurgical microscope 300 which is integrated with a density measuring optical system according to the present invention. This metallurgical microscope 300 is adapted to displays an image of a sample (object) 302 which is placed on a stage 301 on a displays 383, and has a density measuring optical system having the following structure:

The density measuring optical system is formed by an illumination optical system 310, two objective lenses 321 and 322, a sampling aperture plate 330, a collimator lens 340, an aperture plate 350, and a photomultiplier 360 which is a photoreceptor.

The illumination optical system 310 is formed by a light source lamp 311, a collector lens 312, an aperture stop 313, a field stop 314, a condenser lens 315 and a beam splitter 316. In this illumination optical system 310, light outgoing from the light source lamp 311 is incident upon the beam splitter 316 which is arranged between the objective lenses 321 and 322 through the collector lens 312, the aperture stop 313, the field stop 314 and the condenser lens 315. This incident light is reflected by the beam splitter 316, and advances to the sample 302 through the objective lens 321. Thus, the metallurgical microscope 300 makes the so-called epi-illumination.

Reflected light which is reflected by the sample 302 is condensed on the sampling aperture plate 330 through the objective lens 321, the beam splitter 316, the objective (tube) lens 322 and a prism 371, to form an image of the sample 302. The prism 371 is provided between the objective lens 322 and the sampling aperture plate 330, for taking part of the reflected light through this prism 371 and guiding the same to an eye point EP through a scale 372 and an ocular 373 so that the operator can observe the sample 302.

The sampling aperture plate 330 is provided with an aperture 331, so that only light components from small regions which are cut out through the aperture 331 are guided toward the photomultiplier 360. The light components passing through the aperture 331 are guided to the aperture plate 350 by the collimator lens 340 for forming an image of a diaphragm (pupil) of the objective lens 321 on the aperture plate 350, while the diameter of an aperture 351 provided on the aperture plate 350 is set to be smaller than the image similarly to the above, whereby a boundary diffraction wave which is generated from an edge of the diaphragm of the objective lens 321 is blocked by the aperture plate 350 and prevented from propagation toward the photomultiplier 360.

On the other hand, light passing through the aperture 351 of the aperture plate 350, i.e., light including no boundary diffraction wave, is incident upon the photomultiplier 360, so that electric signals corresponding to the densities of the small regions are amplified by an amplifier 381, thereafter supplied to a control part 382 for controlling the overall microscope 300 and stored in a memory (not shown) as density data of the small regions. The control part 382 supplies a driver (not shown) for driving the stage 301 with a control signal and successively moves the stage 301 for measuring the densities of the respective portions (small regions) of the sample 302 in the aforementioned manner. An image of the sample 302 is displayed on the display 383 on the basis of the density data obtained in the aforementioned manner.

According to the metallurgical microscope 300 integrated with the density measuring optical system which is formed by the illumination optical system 310, the objective lenses 321 and 322, the sampling aperture plate 330, the collimator lens 340, the aperture plate 350 and the photomultiplier 360, as hereinabove described, it is possible to correctly measure the densities of the respective portions (small regions) of the sample 302, thereby displaying the image of the sample 302 on the display 383 in excellent quality.

While the inventive density measuring optical system is integrated into the epi-illumination type metallurgical microscope 300 for epi-illuminating the sample 302 in the above description, this system can alternatively be integrated into a dark field illumination type metallurgical microscope.

Figure 14:
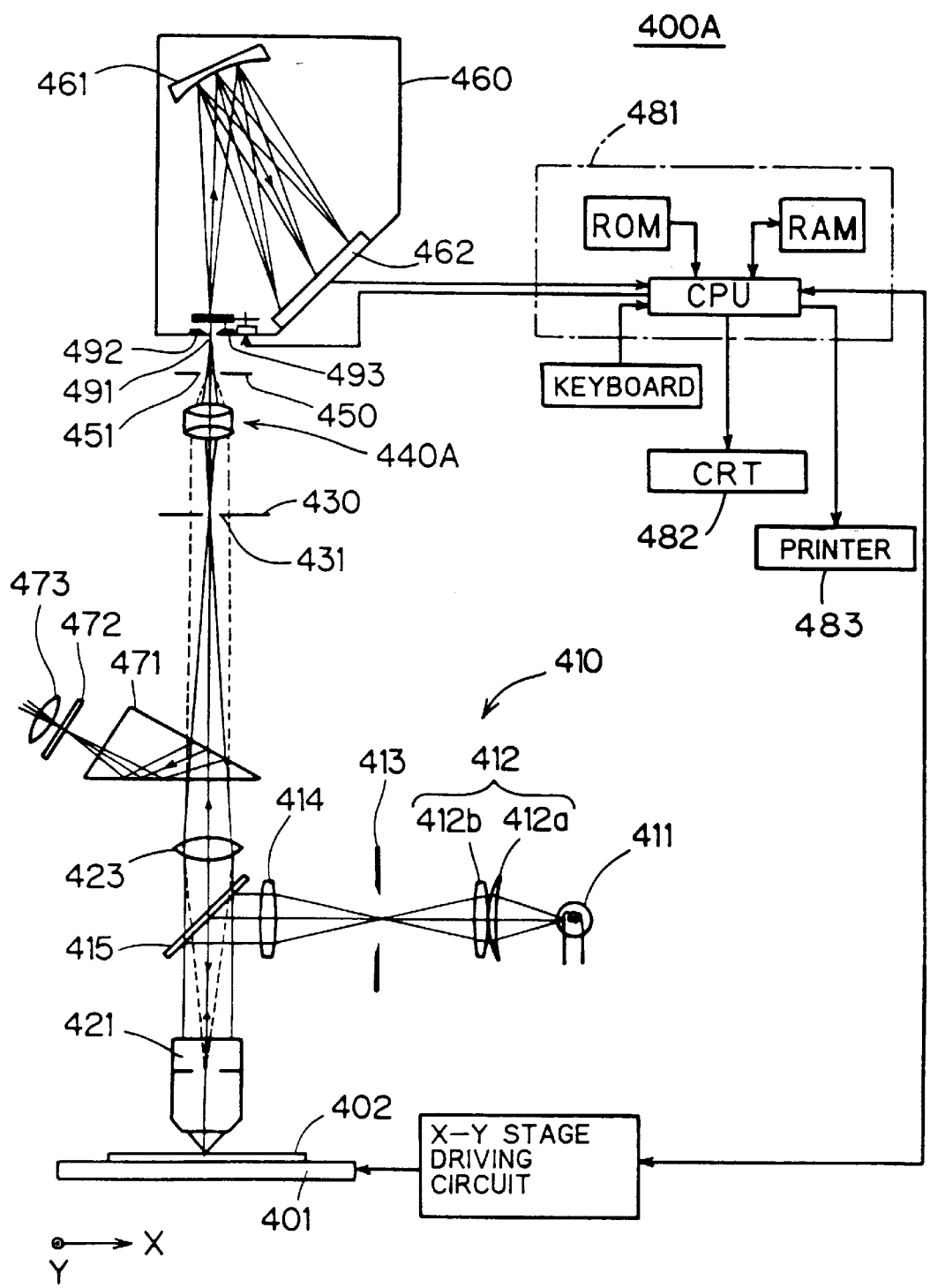
FIG. 14 illustrates an exemplary film thickness measuring apparatus integrated with the density measuring optical system according to the present invention.

FIG. 14 illustrates an exemplary film thickness measuring apparatus 400A which is integrated with a density measuring optical system according to the present invention. This film thickness measuring apparatus 400A is adapted to irradiate a sample (object) 402 which is placed on a stage 401 with illumination light while separating light reflected by the sample 402 into its spectral components and measuring spectral reflectances, for thereafter obtaining the thickness of a transparent thin film provided on the sample 402 on the basis of the measured spectral reflectances. The film thickness measuring apparatus 400A is integrated with the following density measuring optical system, in order to illuminate the sample 402 and measure the spectral reflectances:

The density measuring optical system is formed by an illumination optical system 410, two objective lenses 421 and 423, a sampling aperture plate 430, a relay lens 440A serving as projection means, an aperture plate 450, and a spectral photoreceiving unit 460 for separating reflected light from small regions of the sample 402 into its spectral components and receiving light every wavelength for detecting densities (light intensities).

This illumination optical system 410 is provided with a halogen lamp 411 for emitting white light, which is incident upon a beam splitter 415 arranged between the objective lenses 421 and 423 through a condenser lens 412 consisting of two single lenses 412a and 412b, the field stop 413 and the condenser lens 414. This incident light is reflected by the beam splitter 415 similarly to the case of the metallurgical microscope 300, and advances to the sample 402 through the objective lens 421. This film thickness measuring apparatus 400A also makes the so-called epi-illumination.

Reflected light which is reflected by the sample 402 is condensed on the sampling aperture plate 430 through the objective lens 421, the beam splitter 415, the objective lens 423 and a prism 471, to form an image of the sample 402. Also in this film thickness measuring apparatus 400A, part of the reflected light is taken out by the prism 471, a scale 472 and an ocular 473 so that an operator can observe the sample 402.

The sampling aperture plate 430 is provided with an aperture 431, so that only light components from small regions which are cut out through this aperture 431 are guided toward the spectral photoreceiving unit 460. The light passing through the aperture 431 is guided to the aperture plate 450 by the relays lens 440A to form an image of a diaphragm (pupil) of the objective lens 421, while the diameter of the aperture 451 provided on the aperture 450 is set to he smaller than this image similarly to the above, whereby a boundary diffraction wave which is generated from an edge of the diaphragm of the objective lens 421 is blocked by the aperture plate 450, and prevented from propagation toward the spectral photoreceiving unit 460.

On the other hand, light passing through the aperture 451 of the aperture plate 40, i.e., light including no boundary diffraction wave, is condensed in the vicinity of an inlet for the spectral photoreceiving unit 460. A plate 492 having a pinhole 491 in its central portion is arranged in the vicinity of this condensing position. Further, a shutter 493 is arranged in the vicinity of the plate 492, so that the shutter 493 is driven on the basis of a signal from a control part 481 for controlling the overall apparatus, thereby controlling whether or not light passing through the pinhole 491 in the reflected light is incident upon the spectral photoreceiving unit 460.

The spectral photoreceiving unit 460 is formed by a concave diffraction grating 461 for separating the reflected light into its spectral components, and a solid-state image pickup device 462 for receiving diffracted light which is diffracted by the concave diffraction grating 461, measuring density every wavelength and detecting spectra. The solid-state image pickup device 462 is arranged in a relation conjugate with the pinhole 491. Therefore, light incorporated in the spectral photoreceiving unit 460 is separated into its spectral components by the concave diffraction grating 461, so that signals corresponding to the spectra of the light are supplied from the solid-state image pickup device 462 to the control part 481. This control part 481 obtains the thicknesses of thin films (not shown) formed on the small regions of the sample 402 on the basis of the signals, and outputs the results to a CRT 482 and a printer 483.

According to the film thickness measuring apparatus 400A integrated with the density measuring optical system which is formed by the illumination optical system 410, the objective lenses 421 and 422, the sampling aperture plate 430, the relay lens 440A, the aperture plate 450 and the spectral photoreceiving unit 460, as hereinabove described, it is possible to correctly measure the thicknesses of the thin films formed on the small regions of the sample 402.

Figure 15:
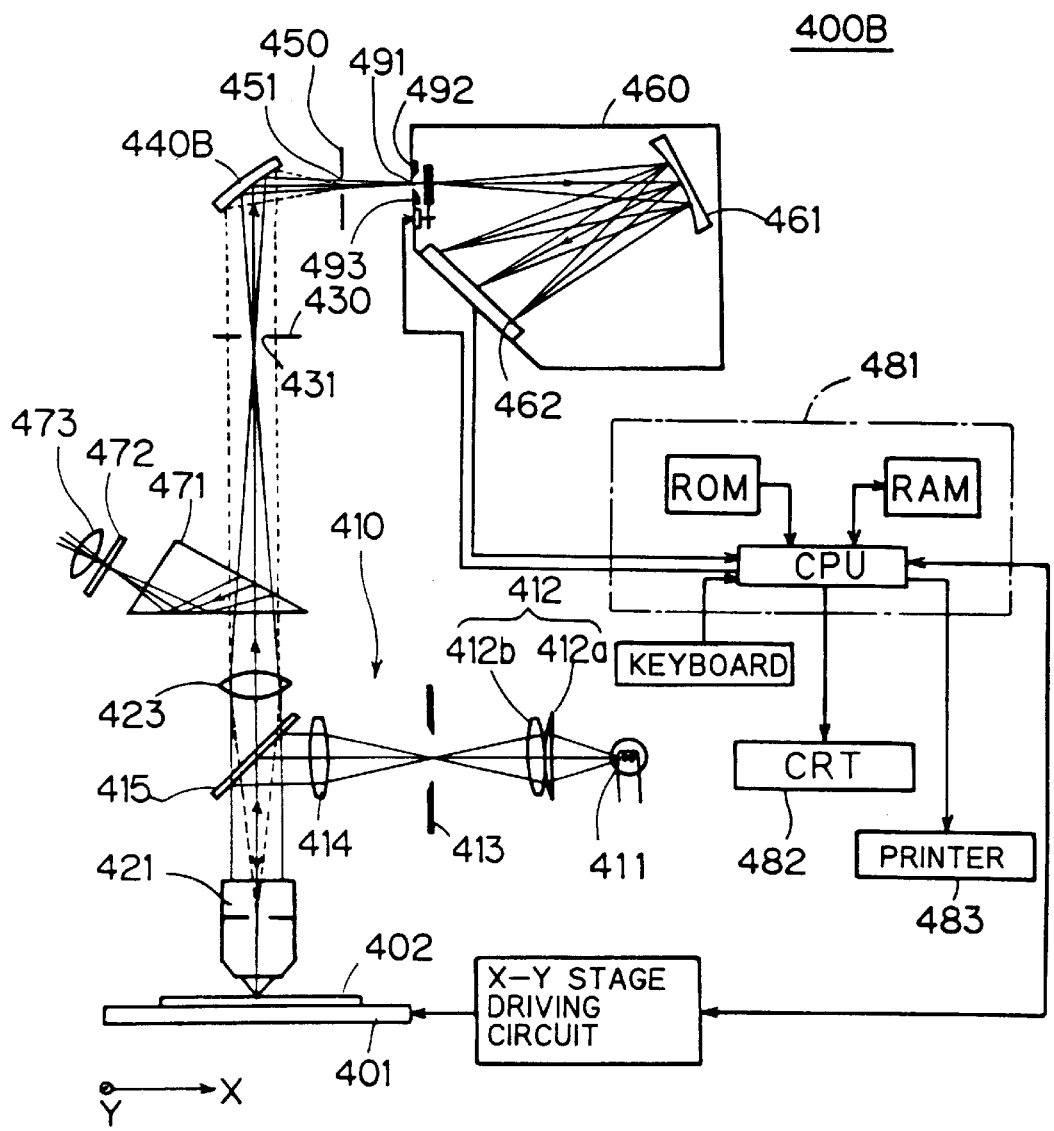
FIG. 15 illustrates another exemplary film thickness measuring apparatus integrated with the density measuring optical system according to the present invention.

While the relay lens 440A is employed as projection means in the above description, an elliptic mirror 440B may be employed in place of the relay lens 440A, as shown in FIG. 15. In this case, it is possible to suppress chromatic aberration due to employment of a reflecting optical device (the elliptic mirror 440B), whereby film thickness measurement can be made in higher accuracy than the film thickness measuring apparatus shown in FIG. 14.

A scanning optical microscope according to the present invention is now described.

Figure 1A:
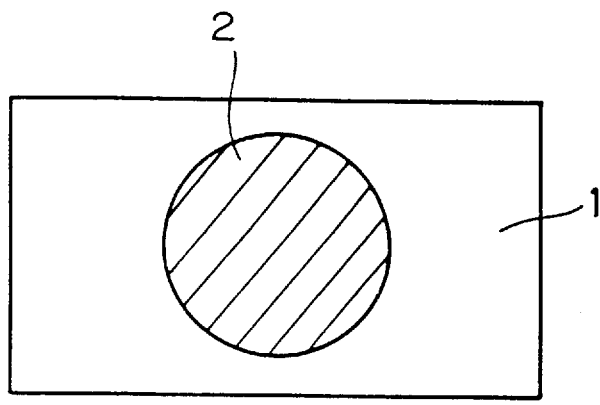
FIGS. 1A and 1B illustrate image surface illuminance distribution obtained in case of acquiring an image of, measuring or observing a small black point with a conventional image pickup apparatus, a conventional density measuring optical system or a conventional scanning optical microscope.
Figure 1B:
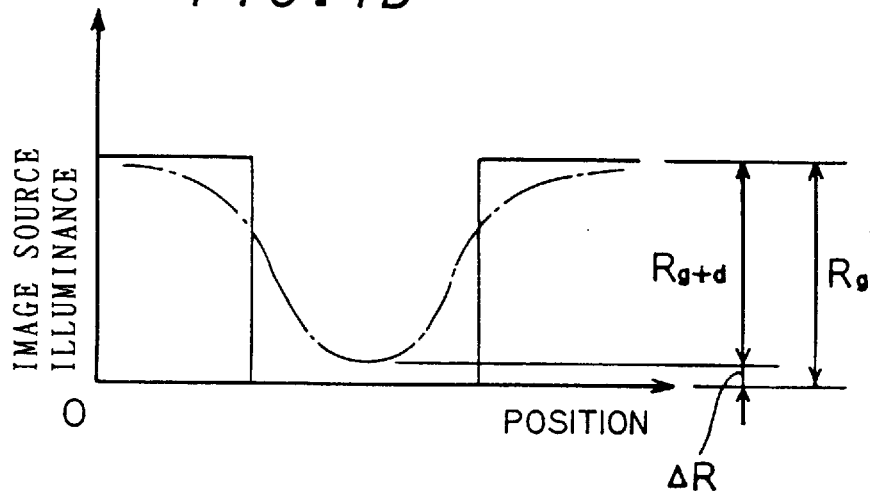
Figure 2:
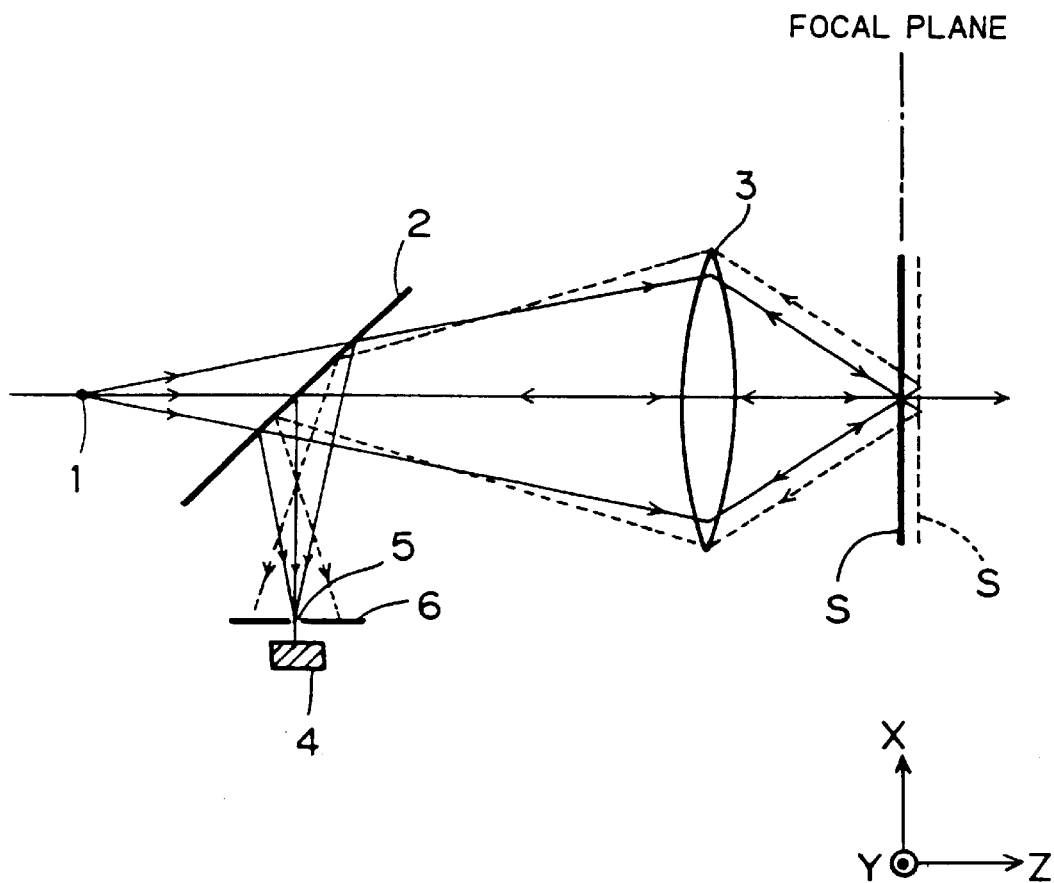
FIG. 2 illustrates an exemplary conventional scanning optical microscope.
Figure 16:
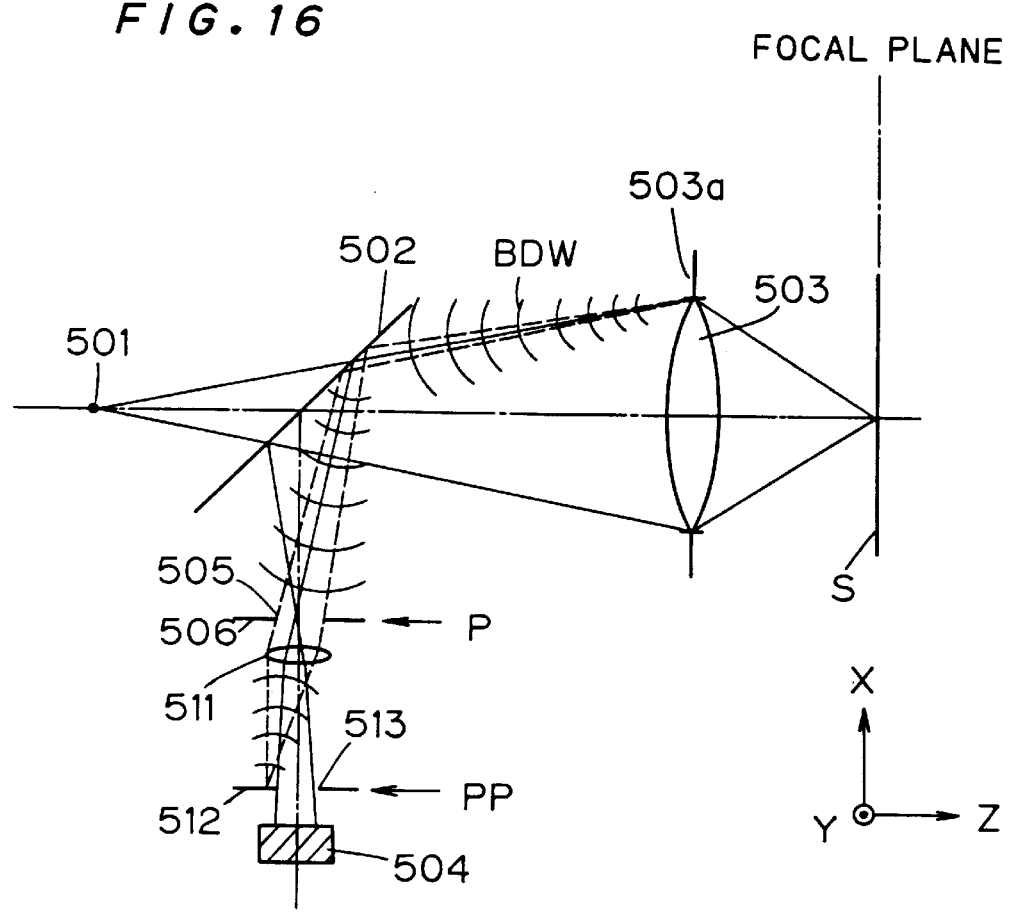
FIG. 16 illustrates an embodiment of a scanning optical microscope according to the present invention.

FIG. 16 illustrates an embodiment of a scanning optical microscope according to the present invention. This scanning optical microscope is different from the prior art (FIG. 2) in a point that a projection lens 511 and an aperture plate 512 are arranged between a pinhole plate 506 and a photoreceptor 504.

Illumination light from a point light source 501 is condensed in the form of a spot through a beam splitter 502 and an objective lens 503, and applied to small regions of a sample(object) S. Light components reflected by the small regions (illuminated portions) are condensed on a position P provided with the pinhole plate 506 by the objective lens 503, to form spatial images of the small regions positioned on the illuminated portions.

The projection lens 511 is provided on a position separated from the pinhole plate 506 by a constant distance toward the photoreceptor 504, so that light passing through a pinhole 505 which is formed on the pinhole plate 506 is guided to the photoreceptor 504 through an aperture 513 of the aperture plate 512. While the pinhole 505 is largely illustrated in FIG. 16 for the purpose of convenience, the same is sufficiently small in practice, and detected portions which are detected by the photoreceptor 504 are limited to the small regions (illuminated portions) in this embodiment.

The projection lens 511 projects an image I of a diaphragm (pupil) 503a of the objective lens 503 on a position PP on the photoreceptor 504 side. The aperture plate 512 is arranged on the position PP for forming the projected image.

Figure 17:
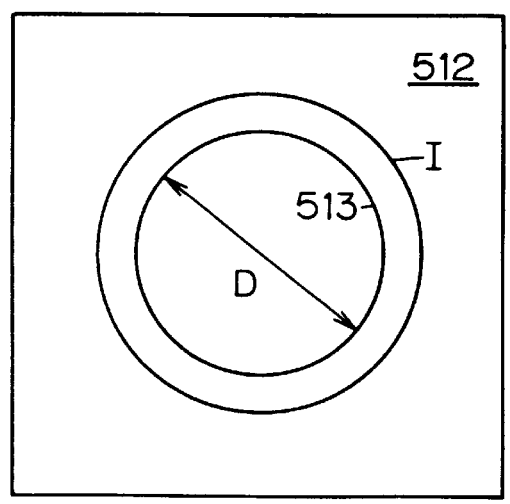
FIG. 17 illustrates the relation between an aperture and a projected image of a diaphragm of an objective lens formed on an aperture plate.

As shown in FIG. 17, this aperture plate 512 is provided with an aperture 513 having a diameter D which is smaller than the projected image I of the diaphragm 503a of the objective lens 503. It is possible to block a boundary diffraction wave BDW which is generated from an edge of the diaphragm 503a of the objective lens 503 by the aperture plate 512, by setting the diameter D of the aperture 513 in the aforementioned manner. This is described in detail with reference to FIG. 16.

As shown by broken lines in FIG. 16, the boundary diffraction wave BDW which is generated from the edge of the diaphragm 503a propagates toward the aperture plate 512 through the projection lens 511. Observing the image I of the diaphragm 503a which is formed on the aperture plate 512, the edge of the diaphragm 503a appears shiny. As clearly understood from the above description, the edge of the diaphragm 503a appears shiny due to the boundary diffraction wave BDW which is generated from the edge of the diaphragm 503a of the objective lens 503. According to this embodiment, the diameter D of the aperture 513 is rendered smaller than the projected image I of the diaphragm 503a as hereinabove described, whereby the boundary diffraction wave BDW is blocked by the aperture plate 512 and prevented from propagation toward the photoreceptor 504. Thus, it is possible to prevent the boundary diffraction wave BDW from passing through the aperture 513 of the aperture plate 512 and entering the photoreceptor 504, thereby eliminating an influence by the boundary diffraction wave BDW.

Further, light passing through the aperture 513, i.e., light including no boundary diffraction wave BDW, is incident upon the photoreceptor 504, which in turn outputs image signals corresponding to the images of the small regions corresponding to the illuminated portions.

While the images of the small regions which are present on the illuminated portions are detected by the photoreceptor 504 so that the corresponding image signals are outputted in the above description, the sample S is moved by sample moving means (not shown) and hence the illuminated portions and the detected portions are simultaneously two-dimensionally scanned so that the images of the small regions of the sample S are successively detected and the corresponding image signals are outputted from the photoreceptor 504 respectively. The image signals obtained in this manner are supplied to an image processing part (not shown), subjected to prescribed image processing, and thereafter displayed on a display (not shown).

According to the scanning optical microscope of this embodiment, as hereinabove described, the boundary diffraction wave BDW which is generated from the edge of the diaphragm (pupil) 503a of the objective lens 503 is blocked by the aperture plate 512 to eliminate an influence by the boundary diffraction wave BDW, whereby S-N ratios of the image signals outputted from the photoreceptor 504 can be improved so that the sample S is excellently displayed and observed on the display.

Figure 18:
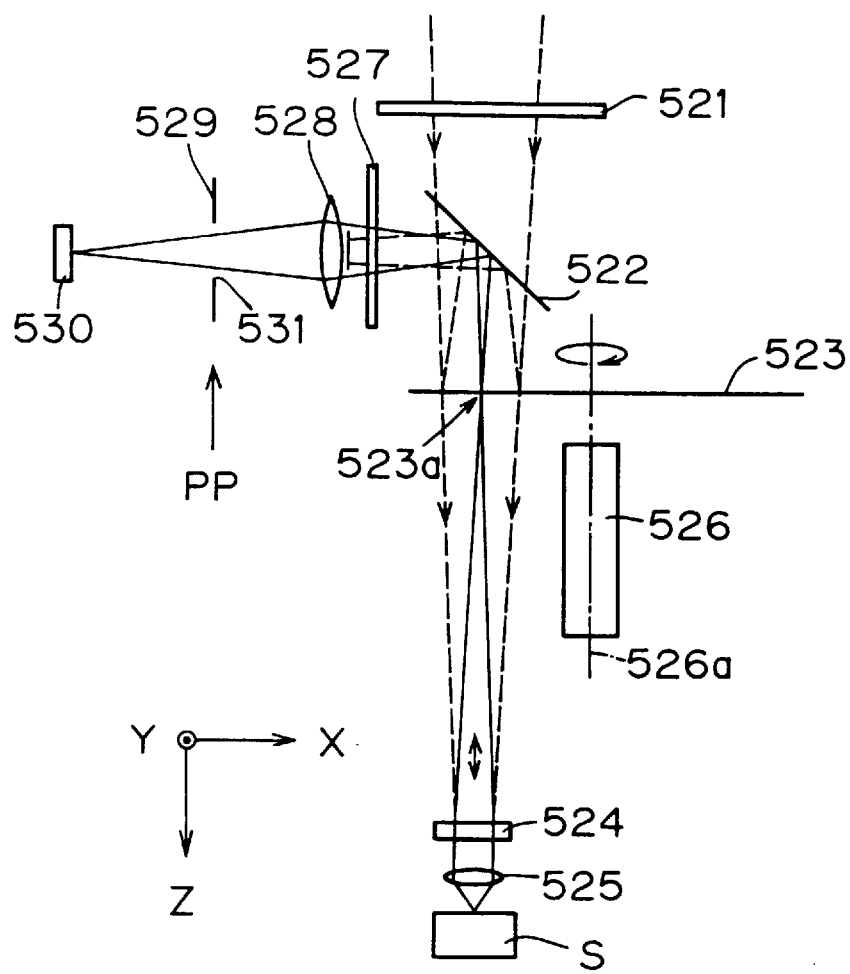
FIG. 18 illustrates another embodiment of the scanning optical microscope according to the present invention.

FIG. 18 illustrates another embodiment of the scanning optical microscope according to the present invention. In this scanning optical microscope, illumination light from a surface light source (not shown) is incident upon a Nipkow disk 523 through a polarizer 521 and a beam splitter 522. This Nipkow disk 523 is spirally provided with a plurality of through holes 523a, so that a plurality of light components outgo from the Nipkow disk 523 when the illumination light from the light source is incident upon a part thereof. Noting a single one of the plurality of outgoing light components, this outgoing light component passes through a quarter-wavelength plate 524, to be thereafter condensed by an objective lens 525 in the form of a spot and applied to a small region on a sample S. The remaining outgoing light components (not shown) are also incident upon different small regions respectively in a similar manner to the above, whereby a plurality of small regions can be simultaneously illuminated independently of each other.

The Nipkow disk 523 is connected to a motor 526 to be rotated about a rotation axis 526a extending in an optical axis direction (direction Z) by the motor 526, so that the plurality of light components outgoing from the Nipkow disk 523 make scanning in a horizontal plane (X-Y directions) for successively illuminating the small regions on the sample S.

The illumination light (the outgoing light component from the Nipkow disk 523) which is incident upon each small region is reflected by this small region and oppositely advances along the same path as the illumination light to the incident upon the beam splitter 522, reflected by this beam splitter 522 and thereafter guided to a two-dimensional photoreceptor 530 through an analyzer 527, an imaging lens 528 and an aperture plate 529. Thus, images of the small regions are successively detected by the photoreceptor 530 so that image signals related to these images of the small regions are supplied to an image processing part (not shown) for executing prescribed image processing, and an overall image of the sample S is thereafter displayed on the display.

Also in this embodiment, the aperture plate 529 is arranged on a position PP for forming a projected image of a diaphragm (pupil) of the objective lens 525 by the imaging lens 528 while the diameter of an aperture 531 which is formed on this aperture plate 529 is rendered smaller than the projected image. Namely, the imaging lens 528 serves as projection means in this embodiment, whereby it is possible to prevent a boundary diffraction wave which is generated from an edge of the diaphragm of the objective lens 525 from entering the photoreceptor 530, to improve S-N ratios of the image signals outputted from the photoreceptor 530, and to excellently display the sample S on the display for observing the same.

Figure 19:
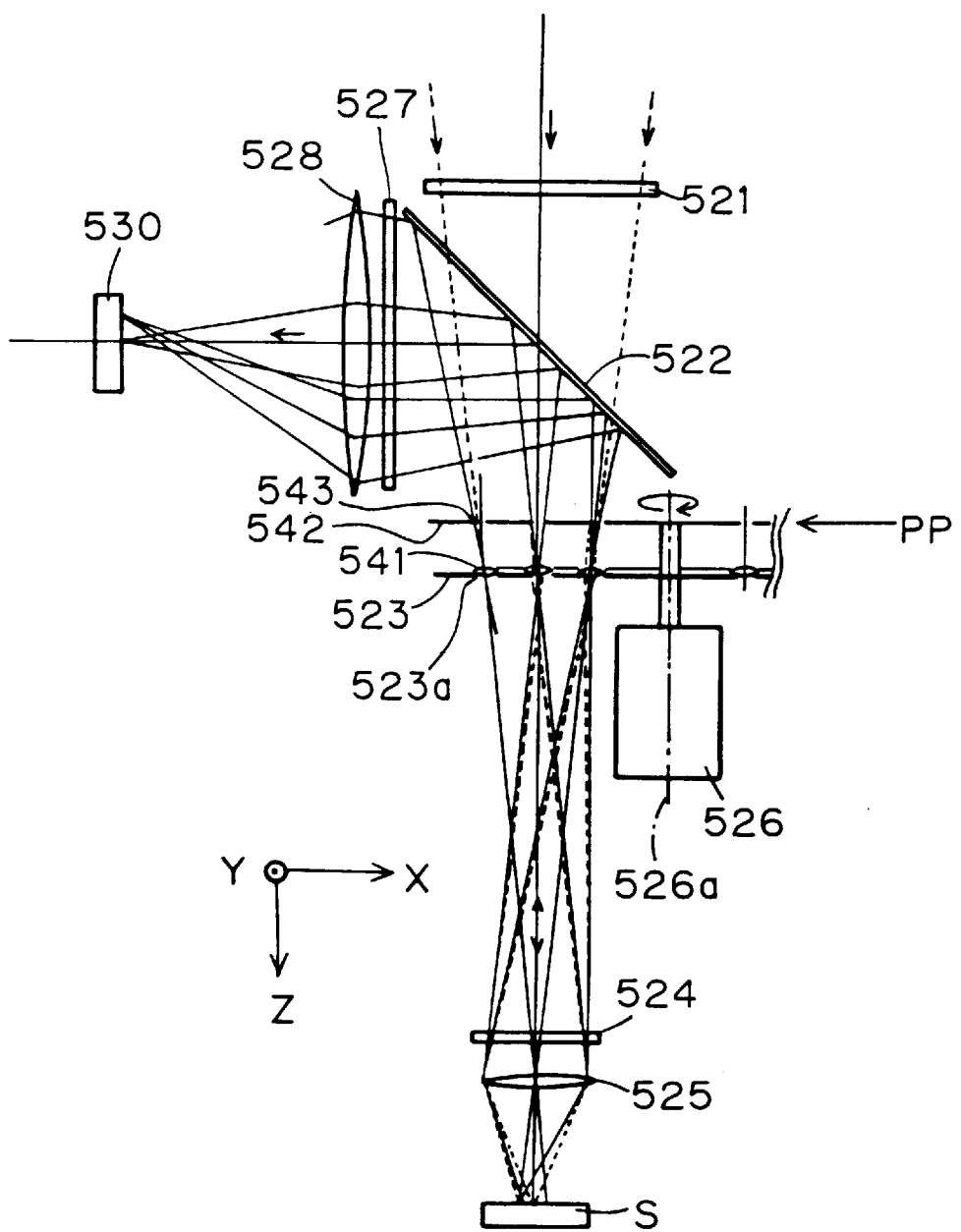
FIG. 19 illustrates still another embodiment of the scanning optical microscope according to the present invention.

While the imaging lens 528 serves as projection means and the aperture plate 529 for blocking the boundary diffraction wave is arranged between the imaging lens 528 and the photoreceptor 530 in the aforementioned embodiment, microlenses 541 may be brought into close contact with a Nipkow disk 523 in correspondence to a plurality of through holes 523a which are formed in the Nipkow disk 523 and a microaperture array plate 543 having microapertures 542 corresponding to the through holes 523a of the Nipkow disk 523 respectively may be provided so that the Nipkow disk 523 and the microaperture array plate 543 are integrally rotated by a motor 526 as shown in FIG. 19, in place of providing the aperture plate 529. Also in this modification, however, the microlenses 541 and the microaperture array plate 543 must be arranged to satisfy the following relation: The microlenses 541 serve as projection means and form a projected image of a diaphragm (pupil) of an objective lens 525 on a position PP, and the microaperture array plate 543 must be arranged on this position PP. Further, the diameter of each microaperture 542 must be rendered smaller than the projected image. When such requests are satisfied, an effect similar to that of the aforementioned embodiment can be attained.

In place of bringing the microlenses 541 into close contact with the Nipkow lens 523, a microlens array which is formed by arranging microlenses 541 corresponding to the through holes 523a of the Nipkow disk 523 respectively may be superposed with the Nipkow disk 523 in this modification. It is also possible to make lens openings of the microlens array function identically to the through holes 523*a* of the Nipkow disk 523, and the Nipkow disk 523 can be omitted in this case.

It may be possible to omit the microlenses 541 by making the Nipkow disk 523 have an imaging function on the basis of the principle of a pinhole camera.

While each of the scanning optical microscopes shown in FIGS. 18 and 19 employs the polarizer 521, the quarter-wavelength plate 524 and the analyzer 527, these elements are not inevitable for the scanning optical microscope but can be omitted.

While the microscope described above is a confocal microscope, the application of the present invention is not restricted to such a confocal microscope. Further, while the scanning optical microscope shown in FIG. 16 scans the illuminated portions and the detected portions on the sample S by fixing the point light source 501 and photoreceptor 504 and moving the sample S and the scanning optical microscope shown in FIG. 18 scans the illuminated portions of the sample S by swinging the illumination light with the Nipkow disk 523, the means for scanning the illuminated portions and/or the detected portions is not restricted to these. In other words, the present invention is applied to general scanning optical microscopes.

While the invention has been shown and described in detail, the foregoing description is in all aspects illustrative and not restrictive. It is therefore understood that numerous modifications and variations can he devised without departing from the scope of the invention.

What is claimed is:

1. An apparatus for obtaining optical information of an object, comprising:
   a) a lens for converting first light from said object to second light;
   b) imaging means for converting said second light, thereby obtaining third light for forming an image of a pupil of said lens on a prescribed position;
   c) shading means being arranged on said prescribed position for blocking partial light of said third light passing through an outer of a central portion of said image of said pupil, thereby obtaining fourth light by excluding said partial light from said third light; and
   d) photoreceiving means for directly receiving said fourth light thereby obtaining said optical information of said object.

2. The apparatus in accordance with claim 1, wherein said shading means comprises:
   c-1) a first aperture plate having a first aperture of a smaller size than said image of said pupil.

3. The apparatus in accordance with claim 2, further comprising:
   e) information regulating means for supplying only optical information of a specific region of said object to said first light.

4. The apparatus in accordance with claim 3, wherein said information regulating means comprises:
   e-1) restrictive illumination means for illuminating only said specific region of said object.

5. The apparatus in accordance with claim 3, wherein said information regulating means comprises:
   e-1) illumination means for illuminating said object, and
   e-2) a second aperture plate arranged on a position between said object and said lens, said aperture plate having a second aperture of a size being responsive to that of said specific region.

6. The apparatus in accordance with claim 3, wherein said information regulating means comprises:
   e-1) illumination means for illuminating said object, and
   e-2) a second aperture plate arranged on a position between said lens and said imaging means, said aperture plate having a second aperture of a size being responsive to that of said specific region.

7. The apparatus in accordance with claim 2, wherein said photoreceiving means generates information indicating the optical density of a specific region of said object,
   whereby said apparatus serves as a density measuring optical system.

8. The apparatus in accordance with claim 2, further comprising:
   e) scanning means for successively scanning each part of said object and selecting the same as a specific region,
   whereby said apparatus serves as a scanning optical microscope.

9. The apparatus in accordance with claim 1, wherein said imaging means comprises:
   b-1) a lens array, having a parallel arrangement of a plurality of lenses for converting respective parts of said second light to a plurality of third light components, for forming images of said pupil of said lens on respective ones of a plurality of positions being set on said prescribed position,
   said shading means comprises:
   c-1) selective shading means for blocking partial light components of said plurality of third light components passing through outers of central portions of said images of said pupil, thereby obtaining a plurality of fourth light components, and
   said photoreceiving means comprises:
   d-1) image pickup means for directly receiving said plurality of fourth light components in parallel thereby obtaining information for image acquisition of said object,
   whereby said apparatus serves as an image pickup apparatus.

* * * * *